United States Patent
Ward, Jr. et al.

(10) Patent No.: US 9,246,986 B1
(45) Date of Patent: Jan. 26, 2016

(54) INSTANCE SELECTION ORDERING POLICIES FOR NETWORK-ACCESSIBLE RESOURCES

(75) Inventors: David John Ward, Jr., Seattle, WA (US); Laura Ellen Grit, Seattle, WA (US); David Nunnerley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 237 days.

(21) Appl. No.: 13/476,828

(22) Filed: May 21, 2012

(51) Int. Cl.
- *G06F 15/173* (2006.01)
- *H04L 29/08* (2006.01)
- *H04W 4/00* (2009.01)

(52) U.S. Cl.
CPC ............... *H04L 67/10* (2013.01); *H04W 4/005* (2013.01)

(58) Field of Classification Search
CPC ........................................................ G06F 15/16
USPC ........................................................ 709/226
See application file for complete search history.

(56) References Cited

U.S. PATENT DOCUMENTS

| | | | |
|---|---|---|---|
| 5,692,174 A | 11/1997 | Bireley et al. | |
| 6,421,728 B1 | 7/2002 | Mohammed et al. | |
| 6,493,685 B1 | 12/2002 | Ensel et al. | |
| 7,412,538 B1 | 8/2008 | Eytchison et al. | |
| 7,637,426 B1 | 12/2009 | Green | |
| 7,743,001 B1 * | 6/2010 | Vermeulen et al. | 705/400 |
| 7,768,920 B2 | 8/2010 | Goshen et al. | |
| 7,870,044 B2 | 1/2011 | Robertson | |
| 8,024,225 B1 | 9/2011 | Sirota et al. | |
| 8,055,493 B2 | 11/2011 | Rolia et al. | |
| 8,595,191 B2 | 11/2013 | Prahlad et al. | |
| 8,615,584 B2 | 12/2013 | Dawson et al. | |
| 2003/0028642 A1 | 2/2003 | Agarwal et al. | |
| 2003/0088482 A1 | 5/2003 | Blumberg | |
| 2003/0126196 A1 | 7/2003 | Lagimonier et al. | |
| 2003/0229529 A1 | 12/2003 | Mui et al. | |
| 2004/0030740 A1 * | 2/2004 | Stelting | 709/201 |
| 2004/0243430 A1 | 12/2004 | Horstemeyer | |
| 2006/0159014 A1 | 7/2006 | Breiter et al. | |
| 2007/0219837 A1 | 9/2007 | Lu et al. | |
| 2008/0080396 A1 | 4/2008 | Meijer et al. | |

(Continued)

OTHER PUBLICATIONS

"Amazon EC2 Spot Instance," Amazon Web Services LLC, Downloaded Mar. 26, 2012, 11 pages.

(Continued)

*Primary Examiner* — Tauqir Hussain
(74) *Attorney, Agent, or Firm* — Robert C. Kowert; Meyertons, Hood, Kivlin, Kowert & Goetzel, P.C.

(57) ABSTRACT

Methods and apparatus for supporting instance ordering selection policies (ISOPs) for network-accessible resources are disclosed. A system includes a plurality of resource instances of a provider network, and a resource manager. The resource manager assigns an ISOP to be used to respond to instance acquisition requests of a specified type from a particular client. In response to a request of the specified type from the client, the resource manager determines, based at least in part on the ISOP, an order in which a plurality of resource groups (such as a set of instances reservations of the client, or an instance marketplace accessible to multiple clients) is to be examined to obtain an instance for the client. Starting with a first resource group, the resource manager examines each resource group until an instance matching instance selection criteria specified in the request is found.

25 Claims, 10 Drawing Sheets

(56) References Cited

U.S. PATENT DOCUMENTS

| | | | |
|---|---|---|---|
| 2008/0103848 A1 | 5/2008 | Santos et al. |
| 2008/0167928 A1 | 7/2008 | Cao et al. |
| 2008/0243666 A1 | 10/2008 | Rowan |
| 2009/0049114 A1 | 2/2009 | Faraj |
| 2009/0182598 A1 | 7/2009 | An et al. |
| 2009/0276771 A1 | 11/2009 | Nickolov et al. |
| 2009/0281952 A1 | 11/2009 | Toffey et al. |
| 2009/0300635 A1 | 12/2009 | Ferris |
| 2010/0010657 A1 | 1/2010 | Do et al. |
| 2010/0050172 A1 | 2/2010 | Ferris |
| 2010/0070397 A1 | 3/2010 | Hahn-Carlson et al. |
| 2010/0131624 A1 | 5/2010 | Ferris |
| 2010/0131649 A1 | 5/2010 | Ferris |
| 2010/0217865 A1 | 8/2010 | Ferris |
| 2010/0241479 A1 | 9/2010 | Chaushev |
| 2010/0306379 A1 | 12/2010 | Ferris |
| 2011/0119104 A1 | 5/2011 | Levine et al. |
| 2011/0131335 A1 | 6/2011 | Spaltro et al. |
| 2011/0137805 A1 | 6/2011 | Brookbanks et al. |
| 2011/0138050 A1 | 6/2011 | Dawson et al. |
| 2011/0138051 A1 | 6/2011 | Dawson et al. |
| 2011/0145094 A1 | 6/2011 | Dawson et al. |
| 2011/0145392 A1 | 6/2011 | Dawson et al. |
| 2011/0154353 A1 | 6/2011 | Theroux et al. |
| 2011/0161964 A1 | 6/2011 | Piazza et al. |
| 2011/0173038 A1 | 7/2011 | Moon et al. |
| 2011/0173626 A1 | 7/2011 | Chi et al. |
| 2011/0179132 A1 | 7/2011 | Mayo et al. |
| 2011/0202657 A1 | 8/2011 | Chang |
| 2011/0213691 A1 | 9/2011 | Ferris et al. |
| 2011/0213712 A1 | 9/2011 | Hadar et al. |
| 2011/0238458 A1 | 9/2011 | Purcell et al. |
| 2011/0295986 A1 | 12/2011 | Ferris et al. |
| 2011/0295998 A1 | 12/2011 | Ferris |
| 2011/0296025 A1 | 12/2011 | Lieblich et al. |
| 2012/0016721 A1 | 1/2012 | Weinman |
| 2012/0131161 A1 | 5/2012 | Ferris et al. |
| 2012/0159506 A1 | 6/2012 | Barham et al. |
| 2012/0173725 A1 | 7/2012 | Verma |
| 2013/0111027 A1 | 5/2013 | Milojicic et al. |
| 2013/0173418 A1 | 7/2013 | Goad et al. |
| 2013/0212279 A1 | 8/2013 | Dutta et al. |
| 2013/0232252 A1 | 9/2013 | Huang |
| 2013/0238785 A1 | 9/2013 | Hawk |
| 2013/0246208 A1 | 9/2013 | Jain et al. |

OTHER PUBLICATIONS

"Amazon EC2 Instance Types," Amazon Web Services LLC, Downloaded Mar. 26, 2012, 5 pages.

"Amazon EC2 Reserved Instances," Amazon Web Services LLC, Downloaded Mar. 26, 2012, 6 pages.

"Amazon EC2 Instance Purchasing Options," Amazon Web Services LLC, Downloaded Mar. 26, 2012, 2 pages.

"Amazon EC2 Pricing," Amazon Web Services LLC, Downloaded Mar. 26, 2012, 8 pages.

U.S. Appl. No. 13/331,750, filed Dec. 20, 2011, Amazon Technologies, Inc., all pages.

U.S. Appl. No. 13/535,720, filed Jun. 28, 2012, Matthew D. Klein, et al.

U.S. Appl. No. 13/535,715, filed Jun. 28, 2012, Matthew D. Klein, et al.

U.S. Appl. No. 13/535,707, filed Jun. 28, 2012, Matthew D. Klein, et al.

U.S. Appl. No. 13/535,725, filed Jun. 28, 2012, Matthew D. Klein, et al.

AWS Documentation, "Using Cluster Instances," downloaded from docs.amazonwebservices.com/AWSEC2/latest/UserGuide/using_cluster_computing.html on May 16, 2012, pp. 1-6.

Amazon Web Services: AWS Products & Solutions, "High Performance Computing (HPC) on AWS," downloaded from aws.amazon.com/hpc-applications/ on May 16, 2012, pp. 1-3.

Timo Schneider (personal website), "An Oblivious Routing Congestion Simulator," downloaded from perlplexity.org/Research/ORCS/ on May 16, 2012, pp. 1-8.

U.S. Appl. No. 13/431,379, filed Mar. 27, 2012, David John Ward, Jr.

U.S. Appl. No. 13/431,388, filed Mar. 27, 2012, David John Ward, Jr., et al.

U.S. Appl. No. 13/429,957, filed Mar. 26, 2012, David John Ward, Jr., et al.

U.S. Appl. No. 13/431,355, filed Mar. 27, 2012, David John Ward, Jr.

U.S. Appl. No. 13/429,985, filed Mar. 26, 2012, David John Ward, Jr., et al.

U.S. Appl. No. 13/431,348, filed Mar. 27, 2012, David John Ward, Jr.

U.S. Appl. No. 13/431,360, filed Mar. 27, 2012, David John Ward, Jr.

U.S. Appl. No. 13/430,003, filed Mar. 26, 2012, David John Ward, Jr., et al.

U.S. Appl. No. 13/431,393, filed Mar. 27, 2012, David John Ward, Jr.

U.S. Appl. No. 13/475,399, filed May 18, 2012, David John Ward, Jr.

U.S. Appl. No. 13/475,359, filed May 18, 2012, David John Ward, Jr.

U.S. Appl. No. 13/461,605, filed May 1, 2012, David John Ward, Jr., et al.

U.S. Appl. No. 13/475,461, filed May 18, 2012, David John Ward, Jr., et al.

Amazon Web Services, "Discussion Forums; Existing Connections Dropped Rudely when Instance Taken out of ELB", Eric Hammond, Feb. 25, 2011, pp. 1-4.

Amazon Web Services, "Amazon Elastic Compute Cloud (Amazon EC2)", Mar. 24, 2011, pp. 1-26.

Amazon Web Services, "Amazon EC2 Pricing", Feb. 28, 2011, pp. 1-13.

Amazon Web Services, "Amazon EC2 Spot Instances", Feb. 24, 2011, pp. 1-5.

Amazon Web Services, "Amazon CloudWatch", Feb. 24, 2011, pp. 1-5.

Agarwal, Sharad, et al. "Volley: Automated Data Placement for Geo-Distributed Cloud Services." 2010, pp. 1-16.

* cited by examiner

INSTANCE SELECTION ORDERING POLICIES FOR NETWORK-ACCESSIBLE RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. In some cases resource instances may also be sold in one or more marketplaces where the pricing varies based on supply and demand. For some types of long-term resource reservations, customers may typically pay an upfront free for making the reservation, and in addition may have to pay usage-based fees for periods when the reserved resource is activated. In many cases, customers may make long-term reservations for some expected level of workload for each of several application types, and may rely on using (potentially more expensive) on-demand instances or dynamically priced instances (e.g., in a spot market) if and when the workload of any of the application types increases beyond the expected level. However, especially for accounts with large numbers of reserved instances and large numbers of active users of the network-accessible resources who may not have a big-picture view of the account's resource assets, situations may arise where users attempt to acquire additional resource instances (e.g., in the spot marketplace) without being aware of the fact that at least some of the additional workload for which they are acquiring the additional resources may be handled more economically.

Figure 1:
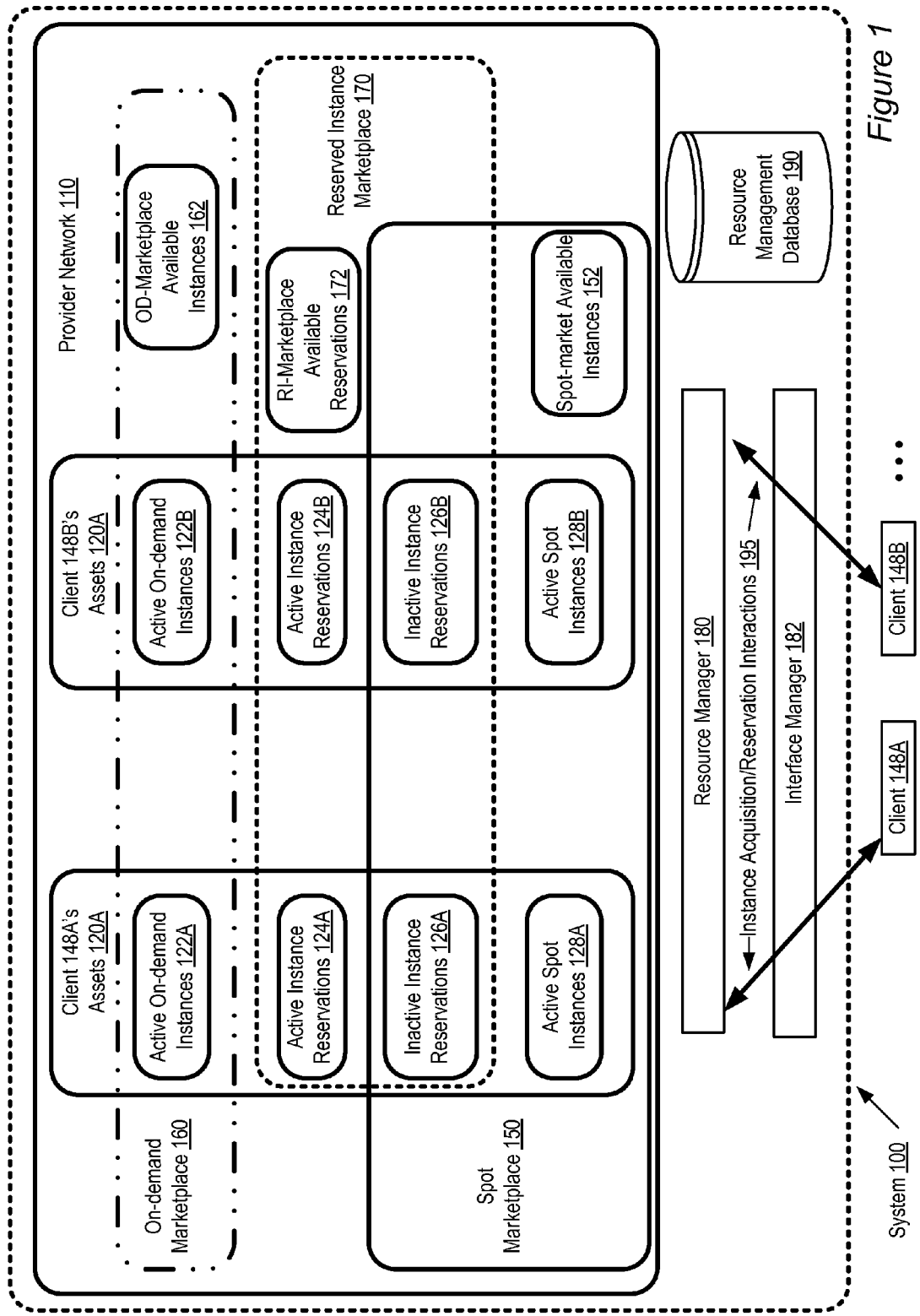
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for managing instance selection ordering policies for network-accessible resources are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resources, such as collections of physical and/or virtualized computer servers, storage devices, networking equipment and the like, needed to implement and distribute the infrastructure and services offered by the provider. The resources may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Operators of such provider networks may in some instances implement a flexible set of resource reservation, control and access interfaces for their clients. For example, an interface manager of the provider network may implement a programmatic interface (e.g., via a web site or a set of web pages, or one or more application programming interfaces (APIs)) that allows clients to learn about, select, purchase access to, and/or reserve resource instances. Such an interface may include capabilities to allow browsing of a resource catalog, provide details and specifications of the different types or sizes of resources supported, the different reservation types or modes supported, pricing models, and so on. The requests received via the interface or interfaces may be handled by a resource manager, and the responses to the requests may be transmitted via one or more of the interfaces back to the requesting client. The provider network may support several different purchasing modes (which may also be referred to herein as reservation modes or resource acquisition modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes—e.g., long-term reserved instances may be allocated from one pool, on-demand instances from another, and so on.

The collection of resources used for each of the reservation types or modes, together with the specific pricing policies in use for the collection, may be termed a "marketplace" in this document. The on-demand marketplace, for example, in one implementation may include a pool of resources instances currently being used in on-demand mode, as well as other instances set aside as a buffer for additional on-demand requests. Similarly, depending on the implementation, the spot marketplace may comprise a set of instances currently in use in spot mode, as well as some reserved instance slots (i.e., logical representations of reservations) that happen not to be activated currently, but for each of which an instance could be launched at short notice if the reserving client requested an instance activation. A reserved instance marketplace may in one implementation include active instances (activated as a result of the reserving clients' requests) as well as reservation slots that have been assigned to clients but do not currently have corresponding active instances. Thus, in the scenarios outlined above, there may be an overlap of resources between the spot marketplace and the reserved instance marketplace. The resource manager may dynamically move resources in and out of the various marketplaces in some embodiments, and may adjust the prices of the various instances and reservations corresponding to each marketplace based on a combination of factors including the pricing policies being enforced in the provider network, as well as based on supply and demand.

In some implementations, a resource allocation may be interrupted—i.e., a resource instance that was previously allocated to the client in a spot marketplace may be reclaimed by the resource manager and may be allocated to some other client that wishes to activate one or more instances that were previously reserved but had not yet been activated, or to a client that is willing to pay a higher spot price. The resource manager may thus be able to use reserved (but currently unused) resource capacity to meet spot-market demand, or even to satisfy on-demand instance requests, thereby increasing overall resource utilization levels without sacrificing the guarantees for long-term reservations. In addition to long-term reserved instances, on-demand instances and spot instances, other purchasing modes or combinations of modes may be implemented by the resource manager in some embodiments.

In at least some embodiments, reserved instances may be further classified based on expected uptime ratios. The uptime ratio of a particular reserved instance may be defined as the ratio of the amount of time the instance is activated, to the total amount of time for which the instance is reserved. Uptime ratios may also be referred to as utilizations in some implementations. If a client expects to use a reserved instance for a relatively small fraction of the time for which the instance is reserved (e.g., 30%-35% of a year-long reservation), the client may decide to reserve the instance as a "Low Uptime Ratio" instance, and pay a discounted hourly usage fee in accordance with a pricing policy for Low Uptime Ratio reserved instances. If the client expects to have a steady-state workload that requires an instance to be up most of the time, the client may reserve a "High Uptime Ratio" instance and potentially pay an even lower hourly usage fee, although in some embodiments the hourly fee may be charged for the entire duration of the reservation, regardless of the actual number of hours of use, in accordance with the pricing policy for High Uptime Ratio instance. An option for Medium Uptime Ratio instances, with a corresponding pricing policy, may be supported in some embodiments as well, where the upfront costs and the per-hour costs fall between the corresponding High Uptime Ratio and Low Uptime Ratio costs. When selecting resources for reservation requests, the resource manager may take into account the requested uptime ratio as well. For example, if the client requests a Low Uptime Ratio, the resource manager may reasonably expect that the resource eventually activated for the Low Uptime Ratio reservation may be available at least some of the time to satisfy spot instance requests. Separate marketplaces may be implemented for each uptime ratio supported for reserved instances in some embodiments.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster). Some clients may wish to specify the locations at which their resources are reserved and/or instantiated, e.g., at either the region level, the availability zone level, or a data center level, to maintain a desired degree of control of exactly where various components of their applications are run. Other clients may be less interested in the exact location where their resources are reserved or instantiated, as long as the resources meet the client requirements, e.g., for performance, high availability, supported software levels, and so on. The marketplaces for the various types of instance acquisition modes (e.g., spot, on-demand and reserved instance) may in some embodiments also be organized based on the geographical locations, regions, or availability zones: i.e., the spot market for one availability zone may be considered distinct, and may have prices and resource inventory independent from, the spot market in a different availability zone.

As noted above, in some embodiments, resources such as compute instances or storage instances of various sizes may be reserved for terms that may be as long as several years. In the cases of some of the entities (such as large corporations or government agencies) that use the instances of a provider network, there may be large numbers of individual users (or groups of users) authorized to make reservations and acquire instances in the different supported modes, all under a single umbrella billing account or other organization-level parent account set up for the entity as a whole. In one example scenario, hundreds or thousands of authorized users associated with a parent account of a given corporation may collectively have made hundreds or thousands of instance reservations of varying reservation terms for instances of varying performance ratings. At any given time in such a scenario, it may very well be the case that at least some of the reservations are inactive—i.e., no instance may be currently booted up corresponding to at least some of the reserved instance slots. Although the fact that there are some unused instances associated with the corporation's parent account may be known to (or determinable by) some administrators within the client environment, organizational boundaries (i.e., the fact that different departments or user groups have separate resource budgets and separate asset administrators) and/or the sheer size of the corporation's asset fleet may result in some of the authorized users requesting acquisition of additional instances in spot or on-demand mode. Since at least in some situations, the usage-based portion of the pricing for reserved instances may be lower than the current pricing for on-demand instances or spot instances, acquiring the additional instances in on-demand or spot mode may be suboptimal for the client from a cost perspective.

Accordingly, in at least some embodiments the resource manager may be operable to provide support for a variety of instance selection ordering policies (ISOPs). A client with a particular billing account may be able to opt-in to using an ISOP for resource acquisition requests from some or all of the users (and/or user groups) associated with that particular account (and in some cases with other accounts that have been linked to the particular account at client request). The client may in some implementations specify several ISOP properties, as described below in further detail, including an order in which different resource groups are to be examined to obtain instances requested by the users. For example, in one scenario the client may specify that if one of the users submits a request for a spot instance, the resource manager should first examine whether any currently unused or inactive reservations exist for the client's account; if any such inactive reservations are found, an instance corresponding to such an inactive reservation may be activated, instead of acquiring an instance on the spot market. Continuing the example, if no inactive reservations are found, the ISOP may indicate that the resource manager should attempt to find an instance in the spot marketplace; and if no spot instance is found or the spot price exceeds some threshold, an attempt to acquire an instance from the on-demand marketplace may be made. In some implementations, instance acquisition requests may also have associated priorities in accordance with the ISOP being used, which may be helpful in deciding the order in which outstanding instance requests should be handled: for example, instance acquisition requests from a production environment may be given higher priority than requests from a Quality Assurance (QA) group of users in one scenario. Thus, using ISOPs, clients may be able to control the sequence in which, for a given type of instance acquisition request from a specified population of authorized users, attempts to acquire resources from different groups of resources are made.

In one embodiment, it may be possible to support different ISOPs for different types of instance acquisition requests— e.g., one ISOP for requests using an API supported for spot market instances, another ISOP for requests using an API for an on-demand instance, and so on. In addition to specifying the preference for the instance acquisition mode or pricing policy (e.g., on-demand vs. spot vs. reserved), each instance acquisition request may also specify other criteria for the desired instance, such as performance capabilities, maximum price, availability zone or other location preferences, software stack requirements indicating the desired combination of operating system, middleware, and other applications, etc. In such an embodiment, the resource manager may associate or assign a particular ISOP with instance acquisition requests of a specified type from a particular client (i.e., for requests from any authorized entity covered by the particular client's billing account, such as various user accounts or group accounts). When an instance acquisition request is received, the resource manager may in some implementations first determine whether the types of request received requires the use of an ISOP at all—e.g., some types of requests may not have ISOPs assigned to them.

If the request has an associated ISOP, the resource manager may determine, based on the ISOP, the order in which a plurality of resource groups is to be examined to obtain an instance for the client, where the plurality of resource groups may include for example (a) a set of instance reservations assigned to an account associated with the client, and (b) a marketplace of one or more marketplaces implemented in the provider network and accessible to multiple clients (including the first client). If the resource manager determines that the set of instance reservations is to be considered before the marketplace, for example, the resource manager may first search the set for a particular reservation (e.g., a currently inactive reservation) matching one or more of the criteria specified in the instance acquisition request, and may only attempt to obtain the instance from the marketplace if no usable reservation is found. If the resource manager determines that a particular marketplace should be considered prior to the reservation set, the resource manager may attempt to find an appropriate instance matching the criteria in the marketplace. In some cases an ordering of more than two resource groups may be specified in the ISOP—e.g. first reservations of the requesting client's account may be searched, then reservations of other accounts linked to the client's account may be searched, then a spot market may be searched, then an on-demand market may be searched, and so on, until an instance is found that meets the criteria. If an instance that matches the requested criteria is found in the course of this ordered search of the resource groups, the resource manager may allocate the instance to the requester. If no instance is found in any of the specified resource groups, the client may be notified that the resource acquisition request did not succeed.

In some cases, in order to comply with an ISOP, the resource manager may have to revoke access to a current user of an instance in order to provide the instance to the requesting client. For example, in one embodiment the resource manager may have temporarily assigned or allocated an instance corresponding to one of the requesting client's inactive reservations to a second client (e.g., in response to a request for a spot-market instance from the second client). In such a scenario, the use of the instance by the second client may be interrupted (e.g., the running instance may be terminated and a new one started) so that the client that requested the instance and already had an appropriate reservation may now get access to a desired instance.

In some implementations, as noted earlier, a number of different authorization entities may correspond to a given client account. For example, a parent billing account of a corporation may allow hundreds of individual users (e.g., employees of the corporation) to access the resources of the provider network, potentially organized into several possibly overlapping user groups (e.g., departmental groups). In one implementation, in order to help the resource manager determine the sequence in which pending instance acquisition requests should be handled, some or all of the authorization entities (users and groups) may be assigned a respective default request priority that is used in scheduling the ordering of responses to instance acquisition requests. Thus, in such a scenario, an instance acquisition request from a user or group would be assigned the default request priority of that user or group. Similarly, in some situations where the resource manager has to select a currently running instance for interruption (i.e., revocation of access from the current user of the instance), there may be multiple such running interruptible instances that are candidates for interruption. In some embodiments a default retention priority may be assigned to users and groups; such priorities may be used when deciding which among several running instances currently assigned to the users/groups should be interrupted. In some implementations, both a default request priority (to be used to prioritize among different instance acquisition requests) and a default retention priority (to be used to select instances to be interrupted when multiple interruptible candidates exist) may be assigned to users and/or user groups, and the priorities may be specified as part of the ISOP associated with a parent account of the users and/or groups. Such default priority settings may be useful, for example, in a scenario where employees in different departments or workgroups of a corporation are to be given different levels of access to the resources of a provider network: e.g., user accounts of employees in a more critical group may be given higher priorities than user accounts of other groups. In one embodiment the resource manager may override or replace the request priority and/or or the retention priority, e.g., in response to an administrator request or if the instance acquisition request itself includes one or more priority indicators. For example, in one implementation a set of default priorities may be used and assigned to various users, but if a bid value is included in an instance acquisition request and the bid value exceeds a threshold value, the bid value may serve to indicate a higher request priority than any of the default priorities. By opting to use an ISOP that supports bid values as priority indicators within instance acquisition requests, a client may be able to implement an "internal" spot market for the reserved instances associated with that client's account. The internal spot market may be organized in an analogous manner to the external spot market in some embodiments, except that only those spot instance requests originating from authorized users tied to a single client account (or some set of linked accounts) may be supported in such a market. Instead of bid values, other metrics may be used to assign priorities to acquisition requests: for example, in some embodiments computation jobs may be queued up for execution in a job queue, and the relative position of a job in the queue may serve as a request priority indicator.

It is noted that, as used herein, the terms "higher priority" and "lower priority" with respect to request priorities and retention priorities may be interpreted as follows, at least in some embodiments. If there are two pending, otherwise equivalent, instance acquisition requests with different request priorities, the one with the higher request priority would in general be responded to before a response is provided to the one with the lower priority. If there are two otherwise equivalent candidate instances available for interruption, with different retention priorities, the one with the lower retention priority would in general be interrupted before the one with the higher retention priority. In some implementations request and/or retention priorities may not be derived from default priorities associated with authorization entities (e.g., users/groups) as described above. Instead, each instance acquisition request may have a request priority assigned to it based on other criteria (such as the relative importance of the task to be performed by the acquired instance, as determined by the requester, by an administrator or manager, or by the resource manager itself), and/or the retention priority associated with an allocation of an interruptible resource instance may be similarly based on other criteria than the authorization-related settings of the instance user.

In some embodiments one or more programmatic interfaces (implemented for example by an interface manager subcomponent of the resource manager, or by an interface manager independent of the resource manager) may be provided to allow clients to request generation of custom ISOPs, or to modify existing ISOPs. Such interfaces may also be used for opting in to the use of an ISOP, to request linkage of accounts for the purposes of applying ISOPs to resource groups and/or authorization entities of multiple accounts, to assign request priorities and/or interruption priorities to various users/groups, and so on. Linking a billing account for client A to a billing account for client B may allow authorized entities (e.g., users/groups) of client A to access resources assigned to client B in accordance with an ISOP shared by accounts A and B in some embodiments. For example, in response to a search for an appropriate instance for an acquisition request from a user U1 among client A's user set, an inactive reservation of user U2 of linked client B's user set may be allocated.

In some embodiments, especially for large client accounts, it may be possible to set up internal marketplaces using custom ISOPs—e.g., a company-specific spot marketplace may be set up, in which different departments or users may bid for unused reservations of the parent company's billing account or accounts. The bids in such embodiments may comprise, for example, amounts of real currencies, or "virtual currencies" implemented within the organization specifically for the internal spot market. In one such embodiment, the resource manager may be able to maintain and provide resource transaction records such as audit trails indicating for example, which instance allocations were preempted or interrupted as a result of an internal spot market bid, when, and by whom, allowing officials of the client organization to get a better understanding of the resource requirements of different groups within the company.

Example System Environment

FIG. 1 illustrates an example system environment, according to at least some embodiments. The system 100 includes a provider network 110 with a plurality of resources instances. The resource instances are shown organized into resource groups based on two example dimensions or categorization approaches: a client allocation dimension and a marketplace dimension. At least three instance acquisition modes are supported in the illustrated provider network 110: spot instances, on-demand instances and reserved instances. Each client 148's assets may include active on-demand instances, active instance reservations (i.e., reservations for which instances are currently running), inactive instance reservations (i.e., reservations for which no instance is currently booted up) and active spot instances. For example, client 148A's assets 120A include a set of active on-demand instances 122A, a set of active instance reservations 124A, a set of inactive instance reservations 126A, and a set of active spot instances 128A, while client 148B's assets 120B include a set of active on-demand instances 122B, a set of active instance reservations 124B, a set of inactive instance reservations 126B and a set of active spot instances 128B.

The resources of the provider network 110 may also be grouped into several marketplaces, each comprising a pool of resources, a pricing policy and other metadata. For example, spot marketplace 150 comprises active spot instances of various clients (including sets 128A and 128B), a buffer set of spare instances 152 available for spot instance acquisition requests, as well as the inactive instance reservations of various clients (which can be allocated to clients that do not own the reservations in response to spot instance requests, but may have to be interrupted if the client that owns the reservation requests an instance activation). Reserved instance marketplace 170 comprises the active and inactive reservations of various clients (including reservation sets 124A, 124B, 126A and 126B) and a set of available reservations 172. On-demand instance marketplace 160 comprises the currently active on-demand instances of various clients, such as sets 122A and 122B, as well as a buffer of available instances 162 set aside for on-demand instance acquisition requests. A resource manager 180 may be responsible for receiving and responding to instance acquisition requests and reservation requests from clients 148, as indicated by the arrows labeled 195, as well as for providing a number of different services specifically related to instance selection ordering policies (ISOPs) as described below in further detail. Interface manager 182 may implement one or more programmatic interfaces (such as APIs, web interfaces, command-line interfaces, or GUIs) for the interactions between clients 148 and the resource manager 180. The resource manager may store persistent representations of various types of configuration information, metadata and metrics in resource management database 190 in some embodiments, including for example settings and metadata related to ISOPs, marketplace policies, pricing histories, usage histories and the like. It is noted that although location details are not shown in FIG. 1, the instances of system 100 may in some embodiments be organized into one or more geographical regions, one or more availability zones in each region, and part or all of one or more data centers in each availability zone, and that the marketplaces and client asset collections may also be partitioned by location—e.g., there may be separate spot marketplaces 150 implemented in each availability zone, with different pricing policies and instance buffers.

The resource manager 180 in the depicted embodiment may, for a given client 148, assign an ISOP to be used to respond to a given type of instance acquisition request. For example, one ISOP may be used for spot-market requests—i.e., requests originally intended by the requester (e.g., one of the users whose resource transactions are billed to the client 148 billing account) to acquire an instance from the spot market 150, while another ISOP may be applied to on-demand instance requests. The type of the acquisition request may be determined based on the specific pricing policy that the requester intends to use to pay for the instance, as indicated in the request—e.g., a spot pricing policy, an on-demand instance policy, or a reserved instance pricing policy. In some embodiments the specific API call used for the request may indicate the type of the request. (The API call use may not be directly evident to the client that issues the request in some implementations—e.g., if the client issues a request for a spot instance via a web form, the submission of the web form may result in an API call to the resource manager that allow the resource manager to identify the request as a spot-market request.) In response to a first instance acquisition request of the given type from the given client, the resource manager 180 may determine, based at least in part on the ISOP, an order in which a plurality of resource groups is to be examined or searched to obtain an instance. The plurality of resource groups may include, for example, (a) a set of instance reservations assigned to an account associated with the given client (e.g., the inactive reservations 126A in the case of client 148A), and (b) a particular marketplace (e.g., the spot market 150) of one or more marketplaces accessible to multiple clients including the first client. Having consulted the ISOP to determine the order in which to consider various resource groups, the resource manager may then proceed to attempt to find an instance from the resource groups in turn. In one example, if the first resource group to consider is the set of inactive reservations of the client 148A, and an inactive instance reservation with the desired characteristics (e.g., matching instance selection criteria such as the desired performance level, location, pricing limit and/or software stack specified in the instance acquisition request) is found, such an instance may be activated for the acquisition request. By activating an existing reservation instead of acquiring an instance on a marketplace where prices may fluctuate dynamically, it may be possible for the client 148A to reduce costs (depending on the current spot market price and its variation during the lifetime of the tasks performed on the acquired instance) and also to reduce uncertainty (since the reservation may generally be unaffected by ongoing demand/supply changes in the more general marketplaces). Of course, if no appropriate unused/inactive reservation is found, an attempt may be made to find an instance that matches the requirements or criteria specified in the acquisition request in the next resource group to consider as specified in the ISOP, such as the spot marketplace or the on-demand marketplace. Once an appropriate instance is found and allocated to the requesting client 148, the resource manager 180 may address the next instance acquisition request that arrives or remains pending. In some embodiments, instance acquisition requests may have request priorities assigned to them, as described below in further detail, and the resource manager 180 may use the request priorities to order the sequence in which pending requests are handled.

In some implementations, when resource manager 180 identifies an appropriate reservation that is assigned to the requesting client 148 but is currently not in use by the requesting client, the instance corresponding to that reservation may be in use by a different client 148K (not shown in FIG. 1), e.g., as part of the spot market 150. That is, at some point in time before the acquisition request is received from the reservation owner client 148A, the resource manager may have temporarily allocated the resources (such as hardware/software platforms) that would have been used for activating an instance for the reservation, to another client 148K, realizing that the resources were not in use by the reserving client 148A. In such a situation, the resource manager 180 may have to revoke access by client 148K to the resources (which may for example involve shutting down or terminating the instance, and/or migrating 148K's applications to another set of resources) so that the requested from the reservation owner 148A can now be fulfilled. If multiple candidate interruptible instances or reservations are found, from which the resource manager 180 has to select one, in some embodiments the resource manager may use respective retention priorities associated with each instance allocation in accordance with a retention prioritization protocol. For example, a retention priority may be based on the user/group credentials of the entity to whom the instance is currently allocated, or based on the accumulated charges accrued to the billing account to whose entity the instance is currently allocated (if the accumulated bill is higher, the client may be given a higher priority), and so on.

As noted above, in some embodiments some or all instance acquisition requests may have request priorities assigned to them, e.g., in accordance with a request prioritization protocol associated with an ISOP. Such priorities may be derived from any desired combination of a number of different data sources in various embodiments. In one embodiment, a priority value or indicator may be applied to each instance request depending on the authorization entity (e.g., authorized user or authorized group) that generates the request; each authorized entity may have an associated request priority setting in such embodiments. Request-specific priorities may also or instead be assigned—e.g., a numerical or monetary "bid value" may be assigned to each instance acquisition request by the requester, and the resource manager 180 may compare the bids of two different pending requests to determine which should be dealt with first. In some implementations request priorities may be based on other factors such as the length of time a request has been pending—for example, a job queue for various computation jobs to be performed may be maintained for the resource manager 180, such that each instance acquisition request corresponds to a respective job, and the priority of a request may be based on the time that the corresponding job has been in the queue. In another example, where computation jobs are interrupted and resumed depending on instance availability, the priority of an instance request for a job may be assigned based on the accumulated computation time of the job—i.e., jobs that have already performed a substantial amount of computation may be prioritized higher than those that have not. A combination of various priority considerations may be used to arrive at a composite or effective priority in some embodiments—e.g., each request may have a default priority based on the requesting authorized entity, but that default may be overridden by a request-specific priority assignment request.

The set of interfaces implemented by interface manager 182 may allow clients 148 to request a number of different ISOP-related requests in some embodiments. For example, clients 148 may specify details of various ISOPs to be created for their use, request assignment of ISOPs to specific request types or authorization entities, view and modify ISOPs, and so forth, in addition to using the interfaces for more basic resource management functionality such as viewing asset status, requesting instance acquisitions and reservations. In some embodiments, when a particular instance acquisition request is submitted via one of the interfaces, the interface may indicate to the requester that an ISOP is going to be used; in other embodiments, the fact that an ISOP is to be used may not be indicated explicitly in the interface. Responses (e.g., acknowledgements that an ISOP has been assigned or created) to various client requests may also be provided by resource manager 180 using the interfaces implemented by interface manager 182 in some embodiments. At least in some embodiments, the fact that an ISOP is used for a particular instance acquisition request (or even the existence of ISOPs and related policies and prioritization protocols) may not be revealed in the interface available to users to submit instance acquisition requests. In such an embodiment, ISOPs may be managed entirely via a separate administrative interface.

Resource Instances Categories and Associated Pricing Models

Figure 2A:
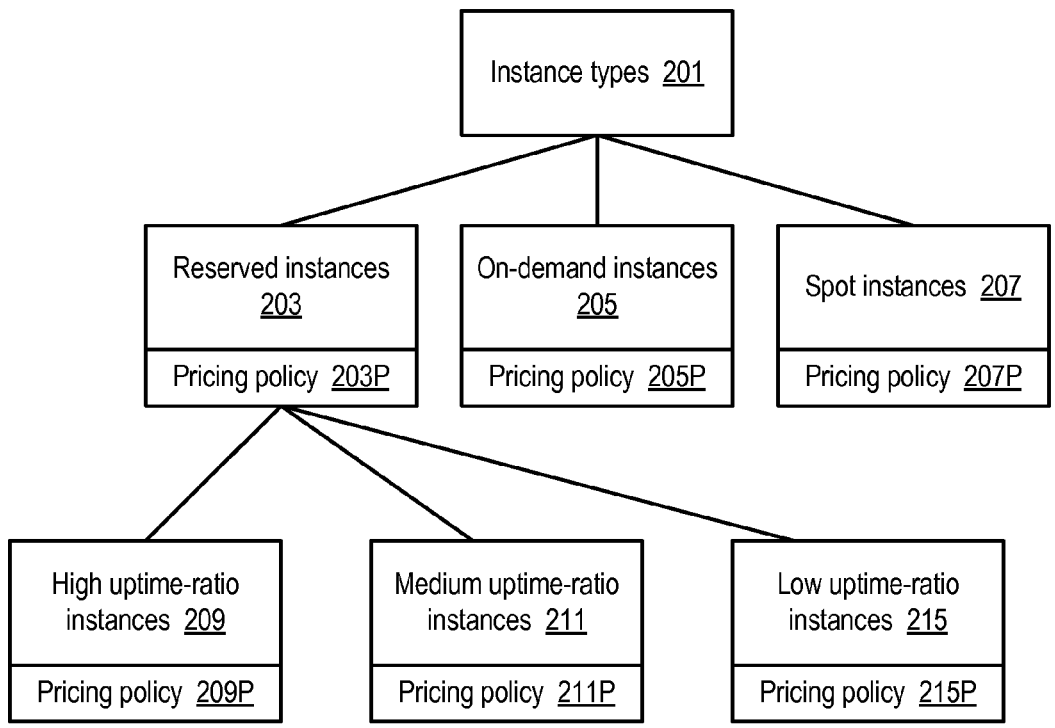
FIGS. 2a and 2b illustrate example resource instance classification approaches, according to at least some embodiments.
Figure 2B:
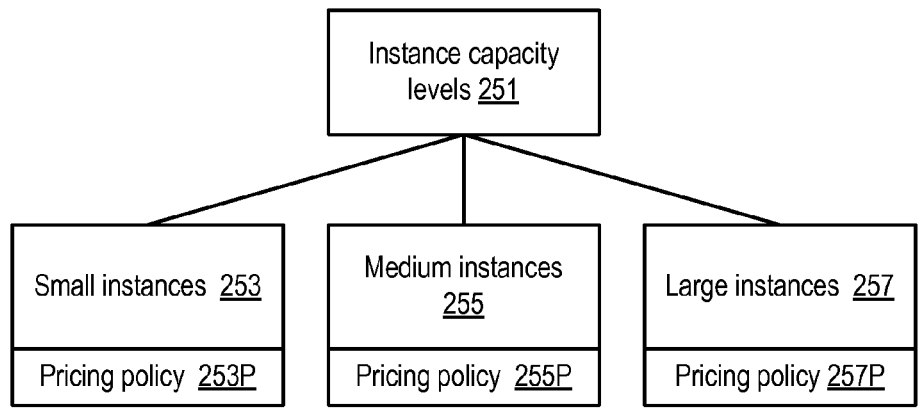

The resource instances of the provider network 110 may be grouped into classes or categories based on several different dimensions in some embodiments, and the pricing policies associated with different classes may differ. FIGS. 2a and 2b illustrate example resource instance classification approaches, according to at least some embodiments. FIG. 2a illustrates an approach in which instances are classified based in part on the timing or duration of instance allocations—i.e., on when instances are obtained by clients and when they are released by the clients. Three high-level types 201 of resource instances are shown, for each of which a respective marketplace or a set of marketplaces may be implemented: reserved instances 203, on-demand instances 205, and spot-instances 207, each with respective pricing policies 203P, 205P and 207P. In one embodiment, a client 148 may reserve an instance in a reserved instance marketplace 170 for fairly long periods, such as a one-year term or a three-year term in accordance with the pricing policy 203P, by paying a low, one-time, upfront payment for the instance, and then paying a low hourly rate for actual use of the instance at any desired times during the term of the reservation. Thus, the client 148 may, by making the long-term reservation, be assured that its reserved instance 203 will be available whenever it is needed.

If a client 148 does not wish to make a long-term reservation, the client may instead opt to use on-demand instances 205 (or spot instances 207). The pricing policy 205P for on-demand instances 205, available for example from an on-demand instance marketplace 160, may allow the client 148 to pay for resource capacity by the hour with no long-term commitment or upfront payments. The client 148 may decrease or increase the resource capacity used, based on application needs, and may only have to pay the hourly rate for the instances used. In some cases the per-hour pricing for on-demand instances may be higher than the hourly rate for reserved instances, because the relatively long durations of reservations may provides a more stable revenue stream to the operator of the provider network than the potentially more dynamic revenue stream provided by on-demand instances. Spot instances 207 may provide a third type of resource purchasing and allocation model, and may be obtained from a spot marketplace 150. The spot pricing policy 207P may allow a client 148 to specify the maximum hourly price that the client is willing to pay, and the resource manager 180 may set a spot price for a given set of resource instances 130 dynamically based on the prices clients are willing to pay and on the number of instances available to support the spot model. If a client 148's bid meets or exceeds the current spot price, an instance may be allocated to the client. If the spot price rises beyond the bid of the client using a spot instance 207, access to the instance by the client may be revoked (e.g., the instance may be shut down). In some embodiments instances that have been reserved by one client but have not yet been activated may be used for the spot market, as indicated by the inclusion of inactive instance reservations 126A in spot market 150 in FIG. 1. As soon as a reservation owning client requests an activation of an instance for a reserved instance that is currently in use by a spot-market customer in such an embodiment, the allocation of that instance to the spot-market customer may be interrupted so that the reservation can be activated.

The prices of reserved instances 203, on-demand instances 205, and spot instances 207 may also vary based on the availability zones or geographic regions in which the instances are located. The operator of provider network 110 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. Of course, the price for a given long-term reservation may typically remain unchanged once a client completes the reservation.

In some embodiments, reserved instances 203 may be further classified based on expected uptime ratios. The uptime ratio of a particular reserved instance may be defined as the ratio of the amount of time the instance is activated, to the total amount of time for which the instance is reserved. Uptime ratios may also be referred to as utilizations in some implementations. If a client 148 expects to use a reserved instance for a relatively small fraction of the time for which the instance is reserved (e.g., 30%-35% of a year-long reservation), the client may decide to reserve the instance as a Low Uptime Ratio instance 215, and pay a discounted hourly usage fee in accordance with the associated pricing policy 215P. If the client 148 expects to have a steady-state workload that requires an instance to be up most of the time, the client may reserve a High Uptime Ratio instance 211 and potentially pay an even lower hourly usage fee, although in some embodiments the hourly fee may be charged for the entire duration of the reservation, regardless of the actual number of hours of use, in accordance with pricing policy 211P. An option for Medium Uptime Ratio instances 213, with a corresponding pricing policy 213P, may be supported in some embodiments as well, where the upfront costs and the per-hour costs fall between the corresponding High Uptime Ratio and Low Uptime Ratio costs. Separate marketplaces or marketplace partitions may be set up for reservations of the different uptime ratios supported in some embodiments.

In one implementation, for each reservation, the resource manager may maintain metadata on various reservation details—e.g., the term of the reservation, the amount of performance capacity reserved, an uptime ratio, pricing information, an indication of a current status of the reservation, an identification of the resource platform being used if the instance is currently active (e.g., an IP address for the instance), and so on. Possible status values of a reservation may in one implementation include, for example, "active" (indicating that an instance is currently booted up and running), "inactive" (indicating that no instance is currently running), or "interruptible" (indicating that another client is using a running instance corresponding to the reservation, e.g., as a spot-market instance, but access to that instance can be interrupted if the holder of the reservation wishes to activate the reservation).

Instance pricing may also vary based on other factors. For example, in the case of compute instances, the performance capacities of different CPUs and other components of compute servers such as memory size may come into play. FIG. 2b shows an example classification of compute instances based on instance performance ratings or capacity levels 251. Large instances 253 may have more computing capacity than medium instances 255, which in turn may have more computing capacity than small instances 257. Accordingly, different pricing policies 253P, 255P and 257P may be implemented for the different sizes of instances. In some embodiments, software features such as operating systems, hypervisors, middleware stacks and the like may also be taken into account in determining the pricing policies associated with various instances. For both compute instances and storage instances, storage device characteristics such as total storage capacity, supported I/O rates and the like may be used to develop pricing policies in some implementations. Pricing policies may also be determined by networking capabilities and networking usage (e.g., number of megabytes of data transferred, and/or the distances over which network traffic is transmitted). Other classification dimensions and techniques, including extensions of the basic hierarchies shown in FIGS. 2a and 2b, may be implemented in other embodiments. Some or all of the pricing information may be stored in resource management database 190 in some embodiments, and may be used by resource manager 180 to generate ISOPs and to handle client requests. In some embodiments, respective marketplaces, as well as respective APIs, may be implemented for each instance type or reservation mode.

Example Interactions Between Clients and the Resource Manager

Figure 3:
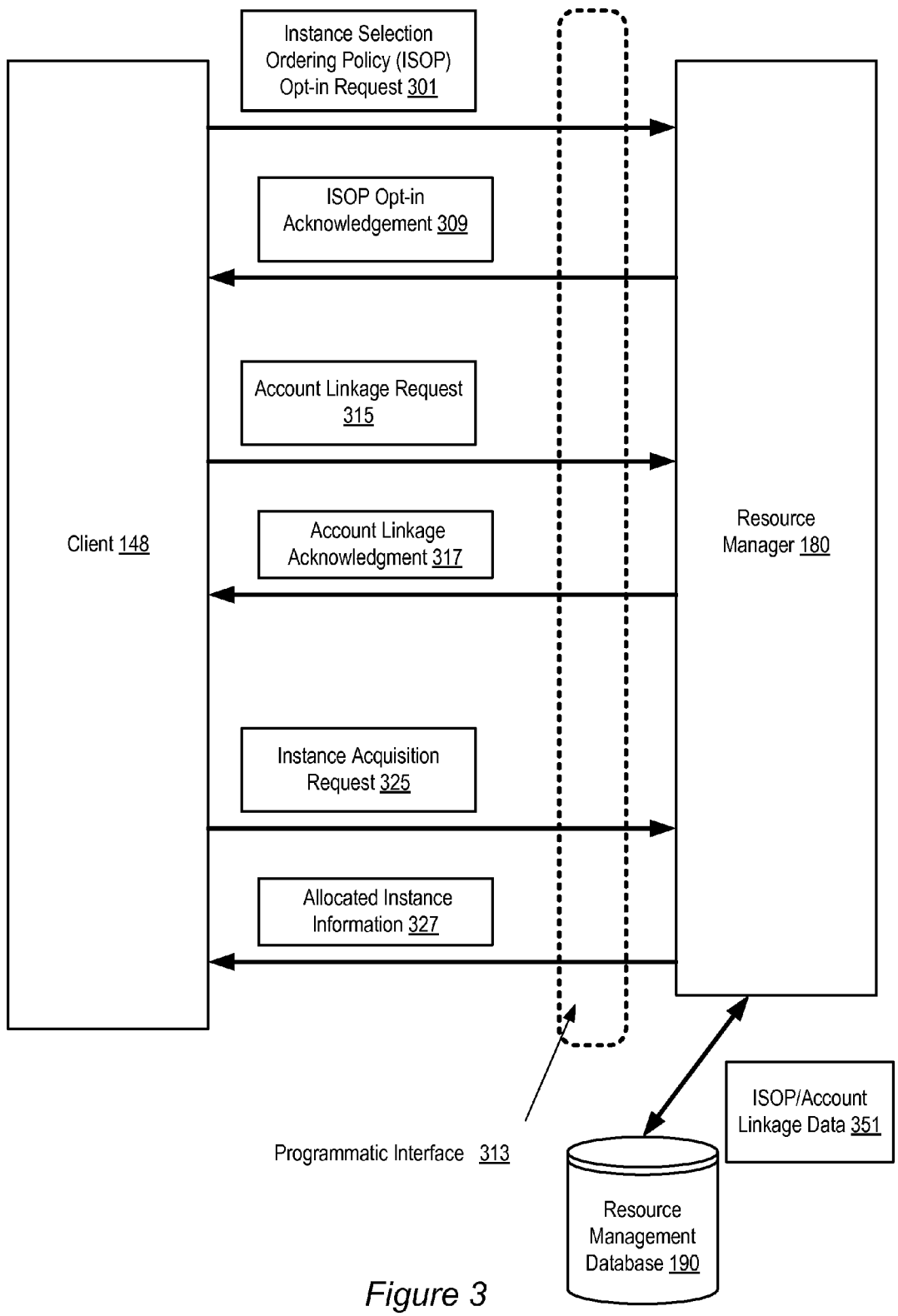
FIG. 3 illustrates examples of several types of interactions, related to the use of instance selection ordering policies, between a client and a resource manager, according to at least some embodiments.

FIG. 3 illustrates examples of several types of interactions, related to the use of ISOPs, between a client 148 and a resource manager 180, according to at least some embodiments. As noted earlier, in some embodiments an interface manager 182 (which may be implemented as an entity external to the resource manager 180, or as a subcomponent of the resource manager 180) may provide one or more programmatic interfaces such as interface 313 usable by clients 148 to interact with the resource manager 180. In some embodiments each client 148 may represent a number of distinct authorized users (e.g., with each user having a separate set of login credentials or user accounts for access to various services provided in the provider network 110) with a single parent client account. Users may further be organized into user groups, and each user and group may be granted certain authorization capabilities regarding resource instances and reservations, as described below in further detail with respect to FIG. 5. The example interactions shown in FIG. 3 may, in such embodiments, occur between individual users whose activities may be billed to the parent client account of client 148, and the resource manager 180. In other embodiments there may be a one-to-one mapping, rather than a one-to-many mapping, between client accounts and users. The term "client", when used herein to indicate a source of requests to the resource manager and a recipient of responses from the resource manager 180, may thus refer to an authorized user of provider network 110 in some embodiments that may share a parent account with other users.

As shown in FIG. 3, a client 148 may send an ISOP opt-in request 301 to the resource manager, specifying a particular ISOP to be used for subsequent client instance acquisition requests. In response, the resource manager 180 may make some configuration changes, e.g., in resource management database 190, linking the client 148 to the specified ISOP, and send an ISOP opt-in acknowledgement 309 to the client 148. The linkage of an ISOP to instance acquisition requests may be done at various granularities in different implementations. For example, in one implementation all the user accounts of a given parent client billing account may be linked to one ISOP; in other cases different ISOPs may be assigned for different user groups associated with the same client billing account, and so on. Each ISOP may be associated with a particular type of instance acquisition request in some embodiments—e.g., only requests submitted using a spot-instance API may be handled in accordance with a specified ISOP, while the resource manager 180 may not be configured to use an ISOP when handling other types of instance acquisition requests such as on-demand instance requests. In some embodiments the resource manager 180 may provide one or more default ISOPs, and a plurality of clients 148 may choose to employ the same ISOP. In one embodiment clients 148 may be allowed to create their own custom ISOPs using ISOP creation requests not shown in FIG. 3.

In at least some embodiments, the resource manager 180 may receive an account linkage request 315 via an interface 313. An account linkage request may, in one such embodiment, specify (a) a plurality of billing accounts and/or authorization accounts to be linked, and (b) one or more resources or metadata properties to be shared between the accounts. For example, an account linkage request 315 may combine one or more resource groups, such as the sets of inactive instance reservations 126A (of client 148A) and 126B (of client 148B), into a shared resource group, to be considered as one resource group when selecting instances to be allocated to a requesting client. By combining resource groups in this way, the pool of available (and potentially cheaper) resources from which instances could be allocated to requests from either client may be expanded. In addition to, or instead of, supporting account linkage at the parent client billing account level, in some embodiments the resource manager 180 may support linkage of user group accounts or individual user accounts. By linking two group accounts, for example, it may be possible to assign the same request priority and/or retention priority to members of both groups. After making requisite configuration settings changes in accordance with the account linkage request 315, resource manager 180 may in some embodiments send an account linkage acknowledgement 317 to the requester.

When the resource manager 180 receives an instance acquisition request 325, in some embodiments the resource manager 180 may look up ISOP/account linkage data 351 in resource management database 190 to determine whether any ISOP is applicable to the request. If an ISOP is applicable, the resource manager 180 may search for an appropriate instance in accordance with the resource group order indicated in the ISOP, and with any other criteria specified in the acquisition request such as instance size, performance level, availability zone, functionality requirements and so on. If an instance is found and allocated to the client in accordance with the ISOP, the resource manager 180 may inform the client about the allocated instance. The allocated instance information 327 provided to the client may include, for example, one or more IP addresses that the requesting client may use to access the instance. If no appropriate instance is found, the client may be informed that the request failed.

Several other client request types, in addition to those shown in FIG. 3, may be handled by the resource manager 180 in some embodiments, such as requests to create or modify ISOPs, to view available ISOPs, to determine which ISOPs were used for which allocated instances, and so on. For each type of ISOP-related operation supported, the resource manager 180 may retrieve the appropriate data from, and/or save the appropriate data in, database 190.

Example Constituent Elements of Instance Selection Ordering Policies

Figure 4:
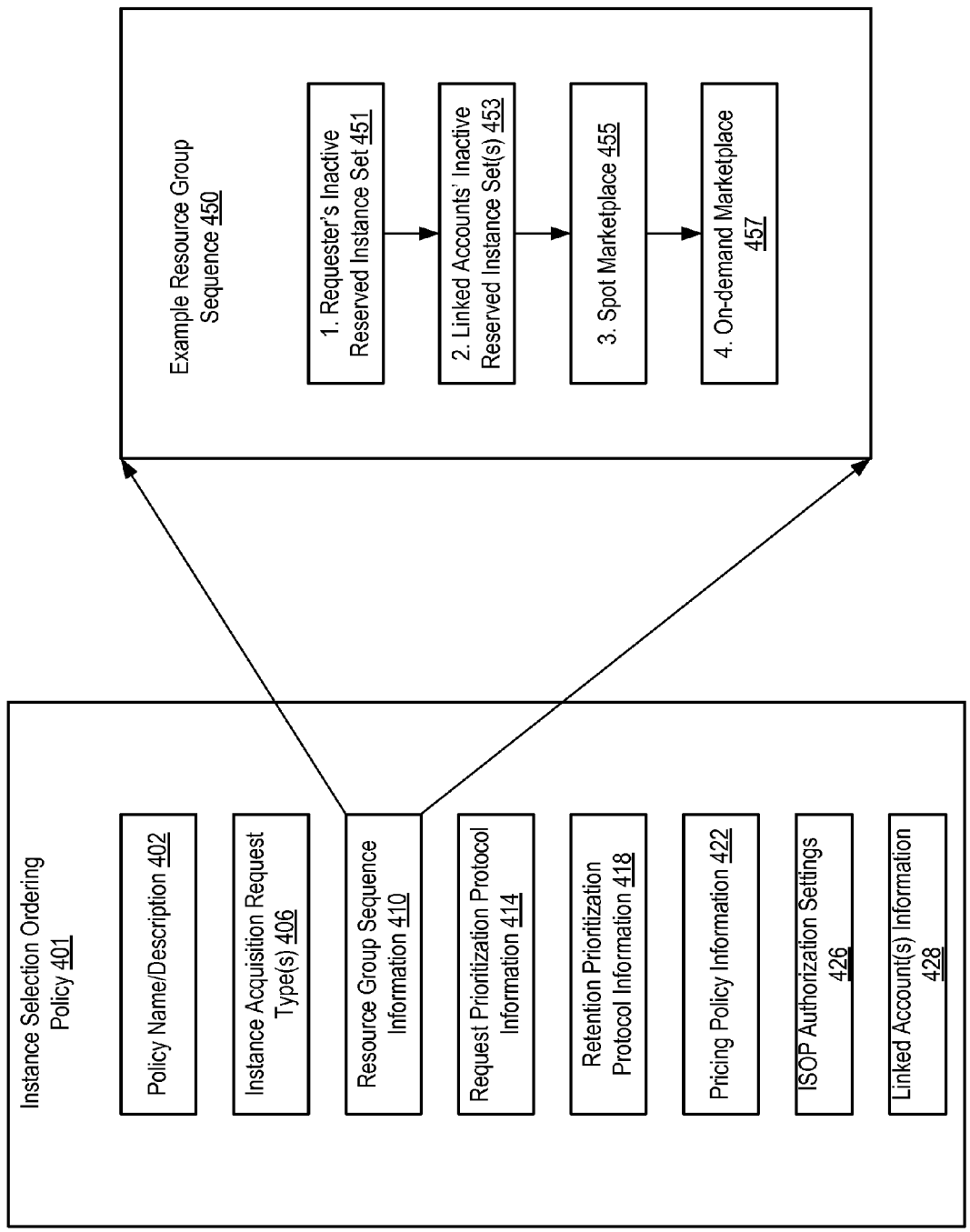
FIG. 4 illustrates examples of constituent elements that may be included within an instance selection ordering policy, according to at least in some embodiments.

FIG. 4 illustrates examples of constituent elements that may be included within an ISOP, according to at least in some embodiments. In the embodiment illustrated in FIG. 4, element 402 may indicate a name and/or description of the ISOP 401. The instance acquisition type or types to which the ISOP 401 is to be applied may be indicated by element 406. For example, one ISOP may be intended for use with acquisition requests directed to the spot marketplace. In some implementations, each instance type (such as on-demand, spot and reserved instances) may have a respective set of APIs, so the use of a particular API may indicate the type of acquisition request. In other implementations the instance acquisition request 325 may explicitly indicate the type of instance desired, or the type of instance preferred, and this information may be used to determine whether any ISOP applies to the request, and if so, which ISOP applies.

The ISOP 401 may also include resource group sequence information 410 in the illustrated embodiment, specifying the resource groups to be considered or searched for an appropriate instance, and the order in which they should be searched. One example of a resource group sequence 450 is shown in FIG. 4. According to this sequence 450, resource groups should be examined in the following order, as indicated by elements 451, 453, 455 and 457. First, the requester client's inactive reserved instance set should be considered, to see if any instances corresponding to one of the currently inactive but at least partially paid-for reservations can be used. If no such inactive reservation is found among the requesting client's own reservation set, inactive reservations of one or more linked accounts may be examined (element 453); if the linked accounts do not yield an appropriate instance, then a spot marketplace may be considered as the next target resource group (element 455). If the spot market does not provide an appropriate instance either—for example because there are no spot instances left to acquire, or if the spot price has risen beyond a maximum price that may have been specified in the instance acquisition request, the on-demand instance marketplace may be explored (element 457) in the example resource group sequence 450. In some implementations resource groups may be further classified by location—e.g., a resource group examination sequence may include the logical equivalent of: "first, check whether an inactive reservation of the client in availability zone AZ1 can be used to fulfill the request; if not, then check whether an inactive reservation of the client in availability zone AZ2 can be used; then check the spot market".

ISOP 401 may include details of, or a pointer to, a request prioritization protocol (element 414) to be used to prioritize outstanding or pending resource acquisition requests. For example, in one ISOP, distinct request priorities may be assigned to each of several user groups (such as request priority RP1 for requests pertaining to a production environment from a production engineering group, and request priority RP2 for requests pertaining to a test environment from a test group). In another ISOP, requests may simply be prioritized implicitly based on the time at which they are received—i.e., an earlier-received request may be treated as a higher priority request than a later-received request. Various other request prioritization protocols may be used in different environments. Retention prioritization protocol information 418 may indicate, in some embodiments, how to choose which among a plurality of interruptible instances should be interrupted—e.g., based on retention priorities based on the user that is currently accessing the instance, accumulated billing amounts (users who have accumulated smaller billing amounts thus far may be interrupted instead of users who have larger accumulated billing amounts), accumulated resource usage (an instance that has accumulated 100 CPU-minutes of execution already may not be interrupted if an instance that has only accumulated 5 CPU-minutes is interruptible) and so on.

Pricing policy information 422 may indicate, for each resource group considered, the pricing rules that should apply if an instance is chosen from that group. For example, in the resource group sequence 450, if an instance is acquired from the requester's inactive reserved instance set 451 or a linked account reservation set 453, the agreed-upon usage-based fee for the corresponding reservation may be applied, while for an instance obtained on the spot market 455, the current spot market costs may apply. In some implementations, pricing policy information 422 may also include any costs incurred for the use of the ISOP itself—e.g., a small fee may be charged if a client 148 wishes to try to optimize instance costs by requesting the resource manager 180 to search for instances in the specified order. In one embodiment, ISOP authorization settings 426 may indicate which authorized entities (if any) are allowed to modify or change the ISOP 401, or to request its application to instance acquisition requests. In some implementations where for example custom client-specified ISOPs are supported, an indication of the owner client account may be included in the authorization settings field 426. Information about whether account linkage is allowed for this ISOP, and if so, the set of accounts currently linked, may be indicated in element 428 in some embodiments. Some or all of the elements shown in FIG. 4 may not be included in different implementations, and additional metadata regarding ISOPs may be included in other implementations. For example, a single prioritization scheme may be used for both request priorities and retention priorities in one implementation, instead of two different prioritization protocols as shown in the illustrated embodiment.

Priority Assignment Based on Authorization Entity Hierarchies

Figure 5:
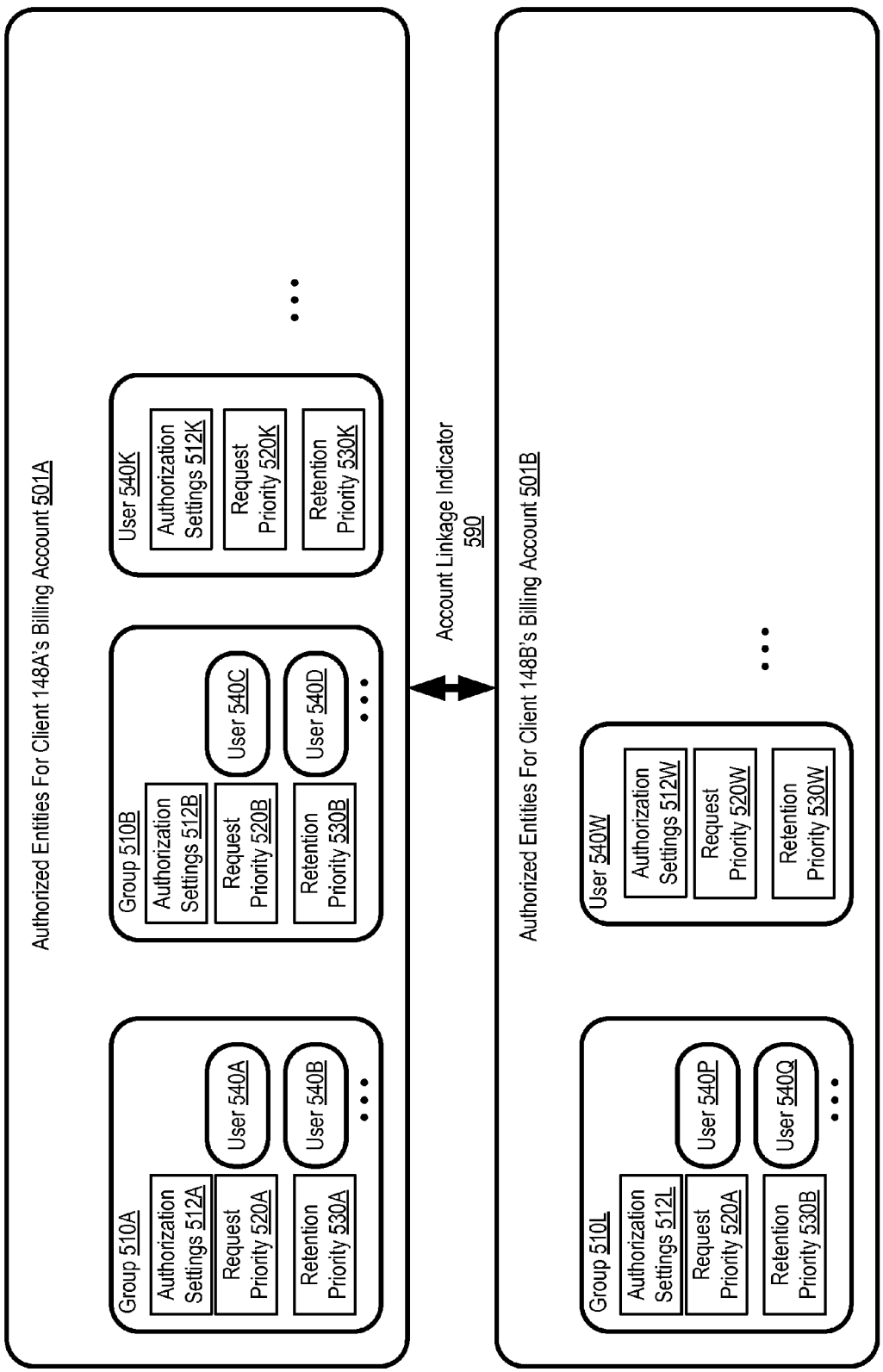
FIG. 5 illustrates an example of a technique for assigning request and retention priority based at least in part on an authorization entity hierarchy, according to one embodiment.

FIG. 5 illustrates an example of a technique for assigning request and retention priority based at least in part on an authorization entity hierarchy, according to one embodiment. A respective set of authorized entities (users, some of which belong to user groups) are shown for two linked client billing accounts, one set for client 148A and one set for client 148B. Client 148A's authorized entities 501A include group 510A, group 510B, and a user 540K that does not belong to an illustrated group. Group 510A in turn includes a number of users including 540A and 540B, while group 510B includes users 540C and 540D. Client 148B's authorized entities 501B include group 510L, which includes users 540P and 540Q, and a user 540W that does not belong to an illustrated group.

In the illustrated embodiment, each authorized user 540 (e.g., 540A, 540B etc.) has a set of authorization settings (e.g., rights to acquire/browse/modify/terminate instances of various types and at various locations within the provider network 110), an assigned request priority, and an assigned retention priority. A user 540 may derive these three sets of properties from the group or groups to which the user belongs—e.g., users 540A and 540B inherit the settings and priorities from group 510A, and users 540P and 540Q inherit their settings and priorities from group 510L. Authorization settings, request priorities and retention priorities may be assigned at the user level as well—e.g., user specific authorization settings 512W, request priority 520W and retention priority 530W apply to user 540W.

The request priorities for a given user 540 may apply to each of the user's instance acquisition requests by default in some implementations; and similarly, the retention priorities 530 of the given user may be applied by default when the user has an instance allocated that is a candidate for interruption by the resource manager 180 implementing an ISOP. As noted above, default request and/or retention priorities may be overridden in some embodiments, for example by specifying a bid or request-specific priority indicator within an instance acquisition request, or by specifying a retention priority proportional to accumulated CPU-time or some other instance-specific metric in the case of a compute instance allocation. As shown in the illustrated example, priority setting values may be shared by users belonging to different groups or even different billing accounts—e.g., the same request priority 520A applies to users 540A, 540B, 540P and 540Q.

Assignment of priorities based on authorization hierarchies may be especially useful for clients 148 that have large numbers of individual users and groups (e.g., based on departmental hierarchies of a corporation), and a potentially large fleet of allocated and/or reserved instances. Such organizations may typically have an authorization database, implemented for example using LDAP (the Lightweight Directory Access Protocol), where attributes for various hierarchically-organized entities are already stored, so that adding priority attributes may be fairly straightforward. Some large clients may have set up multiple billing accounts—e.g., a corporation may set up one billing account for its employees in the United States and another billing account for its employees in Europe, and the ability to link the accounts (as illustrated by linkage indicator 590) so that resources and policies can be shared may also be very helpful.

Figure 6:
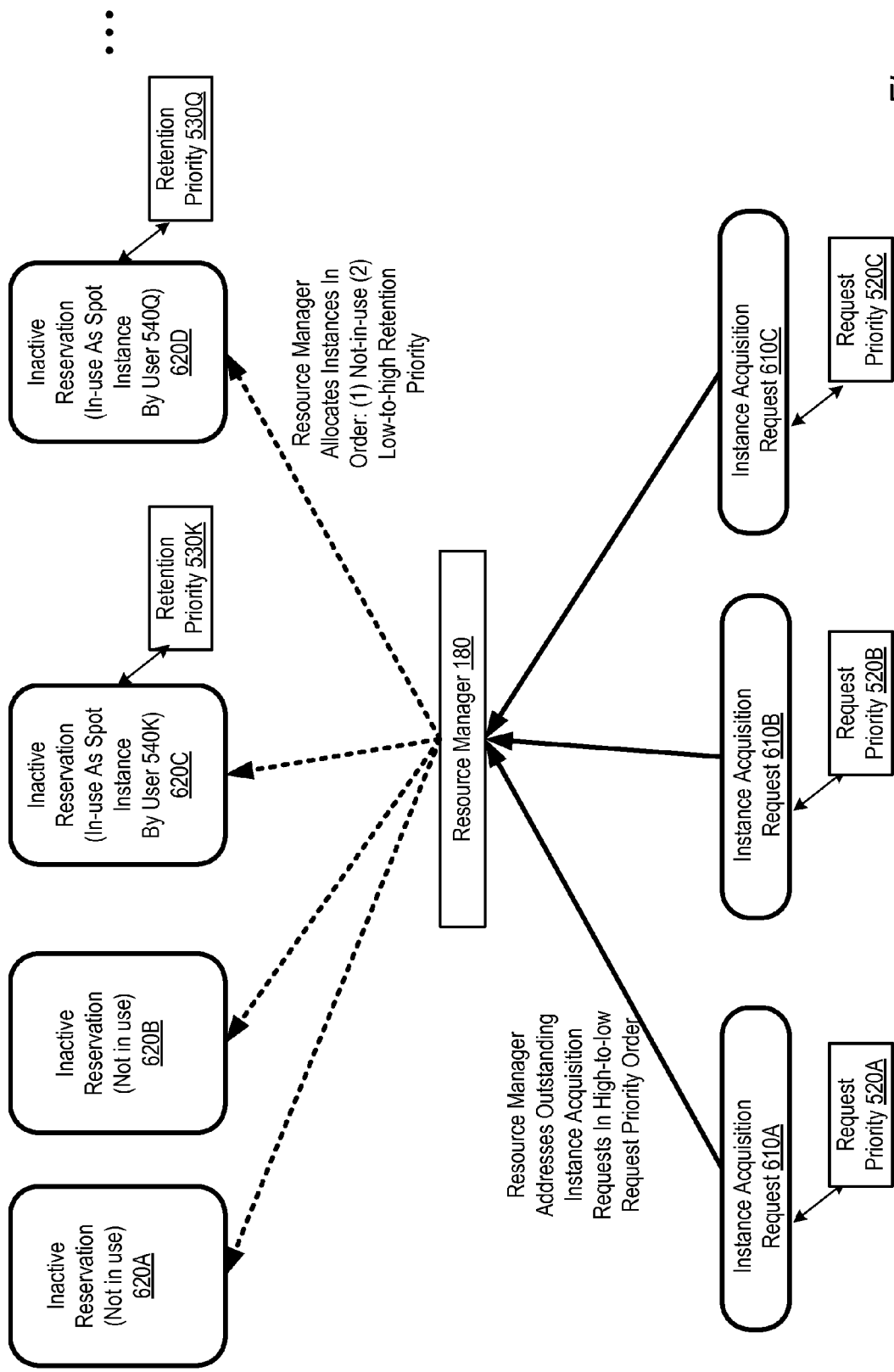
FIG. 6 illustrates an example scenario of priority-based scheduling of instance acquisition requests and priority-based selection of instance interruption targets, according to at least one embodiment.

FIG. 6 illustrates an example scenario of priority-based scheduling of instance acquisition requests and priority-based selection of instance interruption targets, according to at least one embodiment. In the illustrated scenario, three pending instance acquisition requests 610A, 610B and 610C are shown, to each of which a particular ISOP applies. In addition, each request has a corresponding request priority, which may for example have been assigned based on the user or other authorized entity that submitted the request. Resource manager 180 may compare the relative request priorities of the three requests, and address the requests, in accordance with the ISOP, in priority order.

Further, in the illustrated scenario, the ISOP has led the resource manager 180 to find two inactive not-in-use reservation slots (620A and 620B), as well as two candidates for instance interruption representing inactive reservations currently allocated as spot instances to other clients. Any of the four inactive reserved instances may be used to fulfill any of the instance acquisition requests. The resource manager 180 may first allocate instances to the pending requests using not-in-use inactive reservations 620A and 620B. Then, when a decision has to be made regarding which of the inactive reservations 620C or 620D should be used for the third instance acquisition request, the resource manager may determine to use the one that has the lower retention priority.

Methods for Instance Selection Ordering

Figure 7:
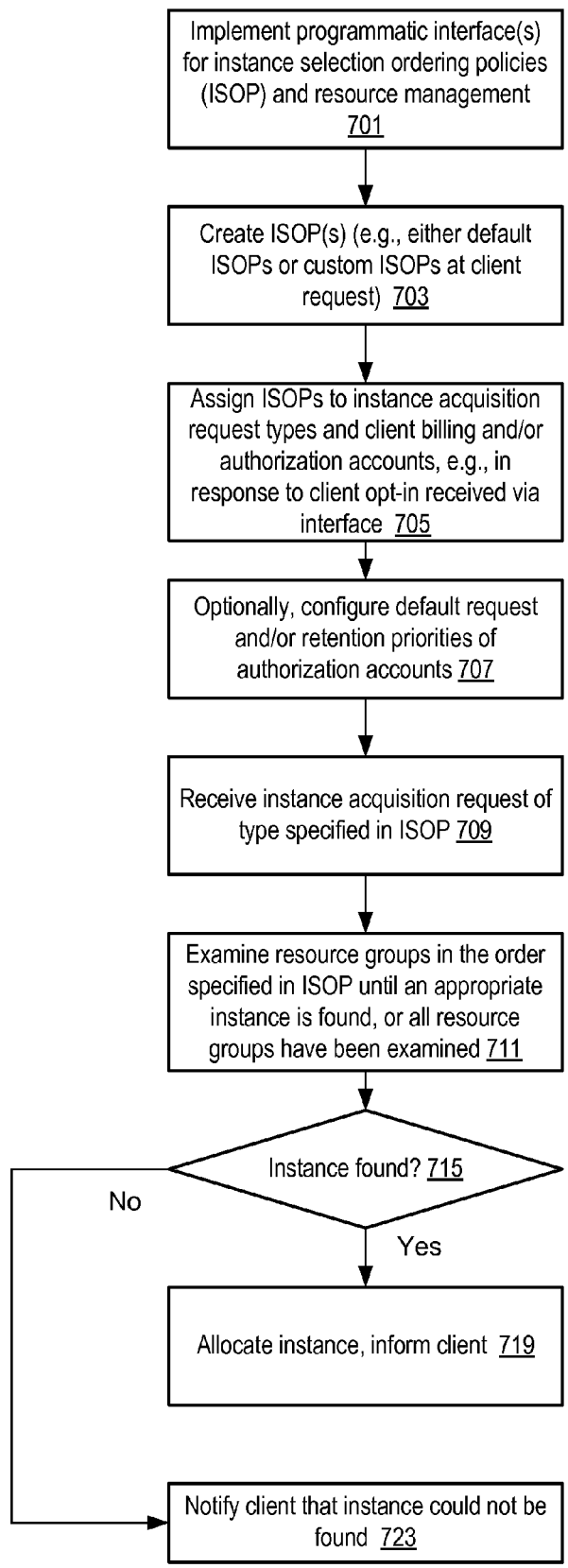
FIG. 7 is a flow diagram illustrating aspects of the functionality of a resource manager related to the assignment and use of instance selection ordering policies, according to at least some embodiments.

FIG. 7 is a flow diagram illustrating aspects of the functionality of a resource manager 180 related to the assignment and use of ISOPs, according to at least some embodiments. As shown in element 701 of FIG. 7, one or more programmatic interfaces may be implemented for ISOPs and other aspects of resource management, e.g., by an interface manager subcomponent of the resource manager 180, or by an independent interface manager 182. The resource manager 180 may create one or more ISOPs (element 703). In some implementations the resource manager may create a set of default ISOPs that clients may use, while in other implementations, clients may be allowed to request that custom ISOPs be created (for example, modified versions of default ISOPs created by the resource manager).

In one embodiment, a client 148 may request that a particular ISOP be assigned to its instance acquisition requests of a specified type or types, e.g., using one of the programmatic interfaces supported. The resource manager 180 may assign the specified ISOP to the client's requests (element 705)— e.g., to requests of the specified type received from some or all of the authorization accounts associated with the client's billing account in some implementations. In another implementation, ISOPs may be assigned by default by the resource manager 180 to at least some request types, and clients 148 may opt out of ISOP use by sending opt-out requests to the resource manager 180. In some embodiments, default request priorities and/or default retention priorities may optionally be assigned to the authorize entities covered by the ISOP (element 707); the specific priority values to be assigned to different users and groups may be indicated by the client using a programmatic interface in some embodiments. Representations of the association of the ISOP with the client account(s) and the various priority-related protocols may be stored by the resource manager 180 in a repository such as the resource management database 190 in some embodiments.

After the configuration changes required to associate the ISOP with the client's requests have been made, the resource manager 180 may receive an instance acquisition request from the client (element 709), indicating one or more instance selection criteria such as a desired instance size or performance level, a desired location such as an availability zone, a maximum price the client is willing to pay, a desired software stack, and so on. In some implementations, not all types of instance acquisition requests may have ISOPs assigned, so the resource manager may first have to determine whether any ISOP is applicable to the request, and if so, which particular ISOP is to be used. If an ISOP to be used for the request is identified, e.g., based on the request type (which may in turn be determined based on a specific API used or a specific pricing policy indicated in the request), the resource manager 180 may start searching for an appropriate instance that matches the selection criteria, examining each resource group in turn in the order specified in the ISOP (element 711). If a matching instance is found (e.g., corresponding to an inactive reservation of the client, or in one of the marketplaces supported by the resource manager 180 and specified in the ISOP), as detected in element 715, the instance may be allocated to the requesting client (element 719) and the client may be informed. In some scenarios, as noted above, the allocation of an instance to another client (e.g., as a spot instance) may have to be interrupted to fulfill the current instance acquisition request. If all the resource groups specified in the ISOP have been examined and no appropriate instance is found, the requester may be notified that no instance is available (element 723).

Figure 8:
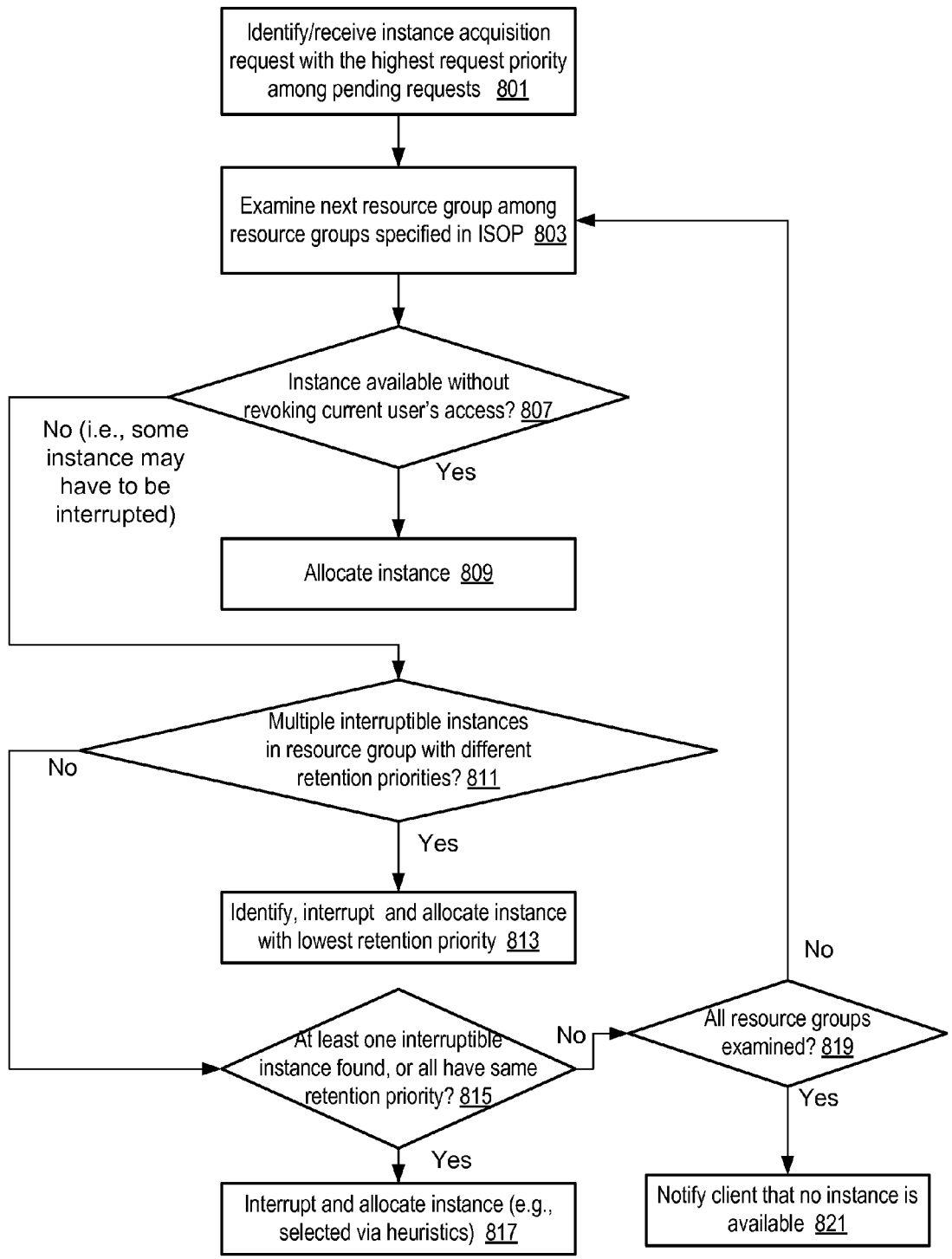
FIG. 8 is a flow diagram illustrating aspects of the functionality of a resource manager related to the use of retention priorities, according to at least some embodiments.

FIG. 8 is a flow diagram illustrating aspects of the functionality of a resource manager 180 related to the use of retention priorities, according to at least some embodiments. As indicated in element 801, the resource manager 180 may, at a given point in time, either select the next instance acquisition request to consider from among a set of pending acquisition requests, or receive a new instance acquisition request when there happen to be no pending requests. In some embodiments, request priorities may be assigned to each request, based for example on the user or authorized entity from which the request is received, or based on other criteria such as the position within a job queue of a job for which the instance is to be used, or a bid value specified in the request. The resource manager 180 may address the request with the highest request priority among those pending. For the selected request, the resource manager may begin examining the resource groups identified in the ISOP assigned to the request in the order specified in the ISOP (element 803).

If, within the resource group being examined, an instance appropriate to the request (e.g., with the desired instance size and/or functionality) is found that does not require the revocation of any other client's or user's access (as determined in element 807), the resource manager 180 may allocate the found instance to the requester (element 809). For example, if the resource manager finds an inactive instance reservation of the requesting client that is currently not in use by anyone, no interruption or revocation of instance access may be required. Similarly, if a new instance is activated for the requester using resources found in one of the marketplaces specified in the ISOP, no interruption may be required. In some cases, however, as also determined in element 807, at least one instance may be found that (a) matches the instance selection criteria of the request (b) is currently allocated to some other user, e.g., as a spot instance and (c) can be interrupted to fulfill the instance acquisition request.

If multiple such interruptible instances are found in the resource group being considered, and at least some of the multiple instances have different retention priorities (as determined in element 811), the resource manager 180 may identify an instance with the lowest retention priority among them, interrupt the current allocation of that instance (e.g., revoke access to the instance from the user to whom the instance is currently allocated), and provide the instance to the requester (element 813). If at least one interruptible instance is found (as determined in element 815), or if all the interruptible instances found have the same retention priority, one instance may be selected for interruption based on heuristics in some embodiments (element 817)—e.g., an instance may be selected based on smallest accumulated runtime, or using a round-robin approach. If no appropriate instance is available in the resource group being examined, and additional resource groups remain to be examined (as detected in element 819), the resource manager may examine the next resource group (803). If all the resource groups identified in the ISOP have been examined, the requesting client may be notified that no instances are available (element 821).

Example Web Interface for Instance Selection Ordering

Figure 9:
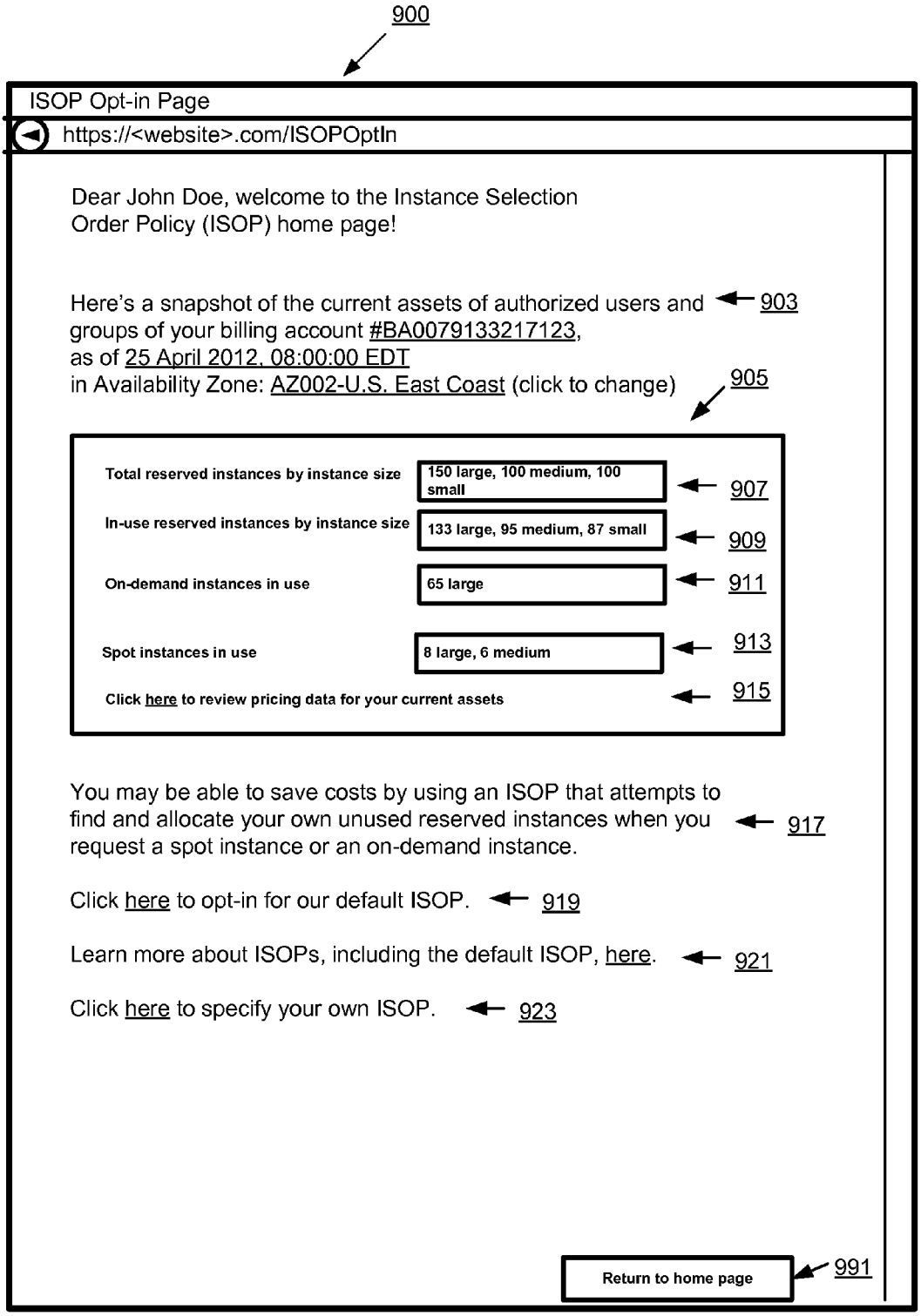
FIG. 9 illustrates a portion of an example web-based interface that may be implemented to allow clients to opt in to a use of an instance selection ordering policy, according to some embodiments.

FIG. 9 illustrates a portion of an example web-based interface that may be implemented to allow clients to opt in to a use of an instance selection ordering policy, according to some embodiments. The interface may be implemented by a standalone interface manager 182 in some embodiments, and by a subcomponent of the resource manager 180 in other embodiments. As shown, the interface may include a web page 900 that includes a message area 903 indicating that a summary view of the assets associated with the client's billing account is provided in area 905. The summary view in the illustrated example is provided as of a specified time, and may be limited to one or more locations such as a specific availability zone. In some implementations clients may be allowed to obtain different summaries by changing the summary timestamp, the location information, and/or the specific billing account (e.g., in cases where a given client has more than one billing account, or has access to one or more linked billing accounts), as indicated by the underlined portions of the message area 903 (the underlines are intended to represent clickable links).

The summary information 905 provided to the client may include, for example, the total number of resource instances of the different types or pricing modes supported, and the number of those instances that are currently in use by the client to whom they are allocated. In the illustrated example, the client has 150 large reserved instances (as shown in element 907), of which 133 are currently in use (element 909). At the same time, the client also has 65 large on-demand instances (element 911) and 8 large spot instances (913). It may thus be possible in this example, especially with the help of an ISOP, for the client to utilize some or all of the 17 existing but not in-use reservations for large instances (150-133), instead of the spot or on-demand large instances. The client may be able to view pricing information for its fleet of reservations and running instances using link 915.

In element 917 of web page 900, the client may be informed that cost savings may be available if the client opts to use an ISOP. A link within element 919 may allow the client to opt-in for a default ISOP. To learn more about the default ISOP and/or ISOPs in general, a clickable link in element 921 may be provided. If the client wishes to specify a new or custom ISOP, the clickable link provided in element 923 may be used to reach additional portions of the web-based interface in which details regarding the ISOPs may be specified.

A number of additional and different web pages may be implemented to support various aspects of the ISOP-related functionality provided by a resource manager 180 in various embodiments. For example, one or more web pages may allow the client to specify priority protocol information, e.g., for resource request priorities and/or retention priorities, as well as user-specific or group-specific ISOPs. In some implementations multiple programmatic interfaces may be supported for each type of operation supported—e.g., a client may be able to use one or more APIs directly to obtain the kinds of information shown in web page 900, and/or to submit the kinds of opt-in requests or ISOP queries supported in web page 900. At least in some embodiments, when a client 148 submits a request via a web page, that request may result in one or more API calls at the resource manager 180 (and/or the interface manager 182). For example, when a client submits, via a web page or form, an instance acquisition request for a spot market instance, the resource manager 180 may receive one or more API calls using an API that is specific to the spot market in one such embodiment. The resource manager 180 may thus be able to distinguish the type of the request, and hence whether any specific ISOPs apply to the request, based on the API call or calls (which may be invoked either directly by the client or as a result of a use of web interfaces, other graphical user interfaces or command-line tools) in some embodiments.

Example Use Cases

The techniques described above for supporting instance selection ordering policies may be useful in a wide variety of environments. As the size of customers' cloud-based resource asset sets or fleets grows, and as the number of individual client users that have access to cloud-based assets grows, the probability that inefficient resource allocation decisions are made may go up as well. The ability of a resource manager to allow clients to indicate which resource groups should be considered, and in what order, when responding to an instance acquisition request, may potentially enable substantial cost savings for the client, and may also at least in some environments reduce the uncertainty associated with resource acquisition and use. If more and more of the client's requests, initially directed at the spot market, can instead be handled by existing unused reservations, for example, the impact of interruptibility and potential cost variations associated with spot market instances may be reduced.

The functionality described above may be particularly appealing to clients that have very large numbers of individual user accounts (e.g., hundreds or thousands of users), potentially organized in a complex corporate hierarchy with many departments. It may be difficult for any one user in such large organizations to become aware, in real time, of the cost savings that may be achieved if a spot instance request were replaced by an activation of an existing instance reservation that happens to be unused. In addition, for large clients, it may be possible to set up internal marketplaces using custom ISOPs—e.g., a company-specific spot marketplace may be set up, in which different departments or users may bid for unused reservations of the parent company's billing account or accounts.

Illustrative Computer System

Figure 10:
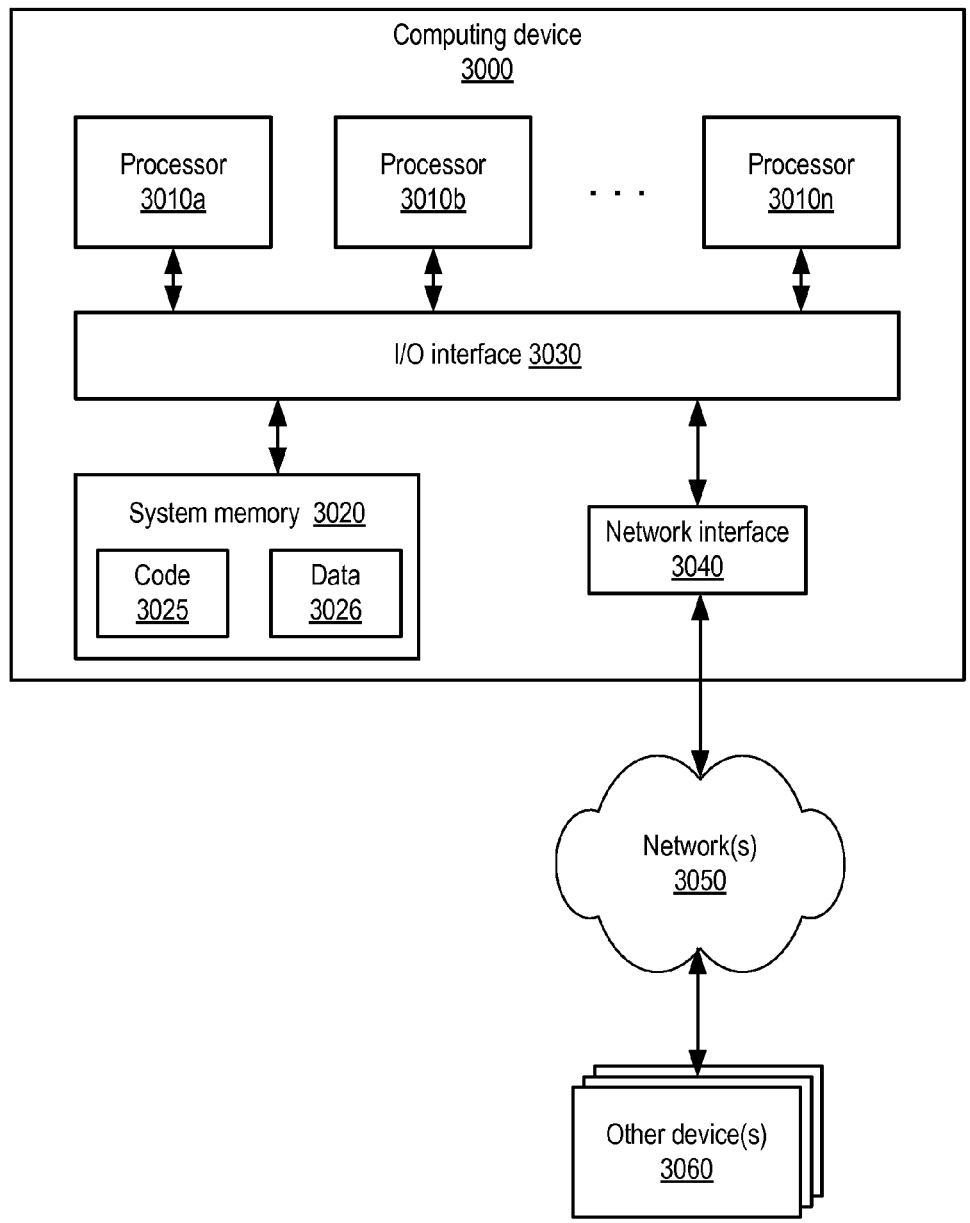
FIG. 10 is a block diagram illustrating an example computing device that may be used in some embodiments.

In at least some embodiments, a server that implements a portion or all of one or more of the technologies described herein, including the techniques to implement the functionality of resource manager 180 and interface manager 182 may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 9, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a plurality of computing devices configured to implement a plurality of resource instances of a provider network; and
    one or more computing devices configured to implement a resource manager;
    wherein the resource manager is configured to:
        assign, based at least in part on one or more instance selection ordering priorities specified by a user or as a default setting, an instance selection ordering policy to be used to respond to instance acquisition requests of a specified type from a particular client; and
        in response to an instance acquisition request of the specified type from the particular client, comprising one or more instance selection criteria:
            determine, based at least in part on the instance selection ordering policy, an order in which a plurality of resource groups is to be examined to obtain an instance for the particular client, wherein the plurality of resource groups includes (a) a set of instance reservations assigned to an account associated with the particular client, and (b) a particular marketplace of one or more marketplaces of resource instances of the provider network accessible to multiple clients including the particular client;
            starting with a first resource group in the order determined at least in part on the policy, examine each resource group of the plurality of resource groups until an instance matching the one or more instance selection criteria is found; and
            activate in the provider network the found instance for use by the particular client, wherein the found instance is found in accordance with the assigned instance selection ordering policy.

2. The system as recited in claim 1, wherein the type of the instance acquisition request is determined based at least in part on an indication in the instance acquisition request of a pricing policy intended to be used to pay for a requested instance, wherein the pricing policy comprises one of: a dynamic spot-pricing policy, an on-demand pricing policy, and a reserved instance pricing policy.

3. The system as recited in claim 1, wherein the type of the instance acquisition request is determined based at least in part on an application programming interface used for the instance acquisition request.

4. The system as recited in claim 1, wherein the one or more marketplaces comprise at least one of: a spot instance marketplace, an on-demand instance marketplace, or a reserved instance marketplace.

5. The system as recited in claim 1, wherein the resource manager is further operable to:
in response to finding an instance that matches the one or more selection criteria, wherein the found instance is in the set of instance reservations assigned to an account associated with the particular client, wherein the found instance is allocated to a different client at the time that it is found, revoke access by the different client to the found instance.

6. The system as recited in claim 1, wherein the instance selection ordering policy comprises an indication of at least one of (a) a request prioritization protocol to be used to schedule pending instance acquisition requests or (b) a retention prioritization protocol to be used to select which particular instance allocation, among a plurality of interruptible instance allocations found in response to the instance acquisition request, is to be interrupted.

7. A method, comprising:
determining, based at least in part on a request comprising one or more instance selection ordering priorities or based on one or more default settings, an instance selection ordering policy to be used to respond to instance acquisition requests;
receiving an instance acquisition request of a particular type from a particular client, wherein the request comprises one or more instance selection criteria; and
in response to the instance acquisition request,
determining, based at least in part on the instance selection ordering policy and the particular type of instance acquisition request, an order in which a plurality of resource groups is to be examined to obtain an instance for the particular client;
starting with a first resource group in the order determined at least in part on the policy, examining each resource group of the plurality of resource groups until an instance matching the one or more selection criteria is found; and
activating the found instance for use by the particular client, wherein the found instance is found in accordance with the instance selection ordering policy.

8. The method as recited in claim 7, wherein the type of the instance acquisition request is determined based at least in part on an indication in the instance acquisition request of a pricing policy intended to be used to pay for a requested instance, wherein the pricing policy comprises one of: a dynamic spot-pricing policy, an on-demand pricing policy, and a reserved instance pricing policy.

9. The method as recited in claim 7, further comprising:
implementing a plurality of application programming interface calls allowing clients to submit instance acquisition requests; and
determining the type of the instance acquisition request received from the particular client based at least in part on the particular application programming interface call of the plurality of application programming interface calls used for the instance acquisition request.

10. The method as recited in claim 7, wherein the plurality of resource groups comprises at least one of: a set of instance reservations of the particular client currently not in use by the particular client, a spot instance marketplace, an on-demand instance marketplace, or a reserved instance marketplace.

11. The method as recited in claim 7, wherein the resource manager is further operable to:
in response to finding an instance that matches the one or more selection criteria in a resource group comprising a set of instance reservations assigned to an account associated with the particular client, wherein the found instance is allocated to a different client at the time that it is found, revoking access by the different client to the found instance.

12. The method as recited in claim 7, wherein the instance selection ordering policy comprises an indication of a request prioritization protocol to be used to schedule pending instance acquisition requests.

13. The method as recited in claim 7, wherein the instance selection ordering policy comprises an indication of a retention prioritization protocol to be used to select which particular instance allocation, among a plurality of interruptible instance allocations found in response to the instance acquisition request, is to be interrupted.

14. The method as recited in claim 7, further comprising:
implementing one or more programmatic interfaces to allow a client to specify an instance selection ordering policy to be used for instance acquisition requests from the client; and
receiving an indication of the instance selection ordering policy from the particular client in accordance with an interface of the one or more programmatic interfaces.

15. The method as recited in claim 7, further comprising:
linking a first account of the particular client to a second account of a second client to allow a resource group comprising instance reservations assigned to the second client to be used to implement the instance selection ordering policy.

16. A non-transitory computer-accessible storage medium storing program instructions that when executed on one or more processors:
receive an instance acquisition request from a particular client; and
in response to the instance acquisition request,
determine, based at least in part on a request type of the instance acquisition request, whether a particular instance selection ordering policy is to be used to obtain an instance for the particular client;
in response to determining that the particular instance selection policy is to be used, examine a set of resource groups in a sequence specified in the particular instance selection policy to obtain an instance for the particular client; and
activate the obtained instance for use by the particular client.

17. The storage medium as recited in claim 16, wherein the request type of the instance acquisition request is determined based at least in part on an indication in the instance acquisition request of a pricing policy intended to be used to pay for a requested instance, wherein the pricing policy comprises one of: a dynamic spot-pricing policy, an on-demand pricing policy, and a reserved instance pricing policy.

18. The storage medium as recited in claim 16, wherein the instructions when executed on the one or more processors:

implement a plurality of application programming interface calls allowing clients to submit instance acquisition requests; and determine the request type of the instance acquisition request received from the particular client based at least in part on the particular application programming interface call of the plurality of application programming interface calls used for the instance acquisition request.

19. The storage medium as recited in claim 16, wherein the set of resource groups comprises at least one of: a set of instance reservations of the particular client currently not in use by the particular client, a spot instance marketplace, an on-demand instance marketplace, or a reserved instance marketplace.

20. The storage medium as recited in claim 16, wherein the instructions when executed on the one or more processors:

in response to finding an instance that matches one or more selection criteria specified in the instance acquisition request within a resource group comprising a set of instance reservations assigned to an account associated with the particular client, wherein the found instance is allocated to a different client at the time that it is found, revoking access by the different client to the found instance.

21. The storage medium as recited in claim 16, wherein the particular instance selection ordering policy comprises an indication of a request prioritization protocol to be used to schedule pending instance acquisition requests.

22. The storage medium as recited in claim 21, wherein the request prioritization protocol comprises using a bid value included in an instance acquisition request to assign a scheduling priority to the instance acquisition request.

23. The storage medium as recited in claim 21, wherein the request prioritization protocol comprises assigning a scheduling priority to an instance acquisition request based on a position within a job queue of a computation job associated with the instance acquisition request.

24. The storage medium as recited in claim 16, wherein the particular instance selection ordering policy comprises an indication of a retention prioritization protocol to be used to select which particular instance allocation, among a plurality of interruptible instance allocations found in response to the instance acquisition request, is to be interrupted.

25. The storage medium as recited in claim 16, wherein the instance acquisition request comprises one or more instance selection criteria to be used in obtaining the instance for the particular client, including one or more of: (a) an instance performance capability requirement (b) an instance location requirement (c) a maximum price the particular client is willing to pay for the instance or (d) a software stack requirement.

* * * * *